INTERCEPT EQUIPMENT

Filed Nov. 23, 1959

INVENTOR
S. F. DUNNING
BY Donald M. Duft
ATTORNEY

INVENTOR
S. F. DUNNING
BY Donald M. Duft
ATTORNEY

INTERCEPT EQUIPMENT

Filed Nov. 23, 1959

INVENTOR
S. F. DUNNING
BY Donald M. Duft
ATTORNEY

INVENTOR
S. F. DUNNING
BY
Donald M. Duft
ATTORNEY

INTERCEPT EQUIPMENT

Filed Nov. 23, 1959

INVENTOR
S. F. DUNNING
BY Donald M Duft
ATTORNEY

INVENTOR
S. F. DUNNING
BY Donald M. Duft
ATTORNEY

Nov. 19, 1963 S. F. DUNNING 3,111,561

INTERCEPT EQUIPMENT

Filed Nov. 23, 1959 8 Sheets-Sheet 7

INVENTOR
S. F. DUNNING
BY Donald M Duft
ATTORNEY

INVENTOR
S. F. DUNNING
BY Donald M Duft
ATTORNEY

United States Patent Office 3,111,561
Patented Nov. 19, 1963

3,111,561

INTERCEPT EQUIPMENT

Sanford F. Dunning, Wheaton, Ill., assignor to American Telephone and Telegraph Company, New York, N.Y., a corporation of New York Filed Nov. 23, 1959, Ser. No. 854,838
21 Claims. (Cl. 179—27)

This invention relates generally to telephone systems and more particularly relates to call intercepting equipment that utilizes announcement and recording devices to expedite telephone service and to minimize the amount and need for operator assistance in the completion of calls.

Although many automatic equipment arrangements have been incorporated in telephone systems to reduce the number of functions performed by operators, operator assistance, nonetheless, is still required for certain services. In semi-automatic systems, such as call distributor systems, private branch exchanges, and the like, operators are still required to assist in the completion of calls. Frequently, these operators, during the completion of calls, are also required to supply general information, advertising messages and other routine announcement services that are tiring tasks for them, decrease their traffic handling capacity, tie up switching equipment and otherwise decrease the overall efficiency of the system. These conditions are prevalent, for example, in large department stores and theaters. The major portion of the incoming calls to these establishments are served by operators and represent requests for information concerning prices, schedules, etc., and for placing orders. In order to more expeditiously serve these types of calls, it is, therefore, desirable to reduce the amount of routine operator effort required to complete the calls.

When a semi-automatic system is not attended by an operator during the night or periods of light traffic, calls directed to customers served by the system may not be completed. The incompleted calls result in the repeated ringing of a call station and no answer. A telephone caller is very likely to become irritated under these circumstances and may even originate subsequent calls in an effort to contact the called party. The latter causes the unnecessary tie-up of switching equipment and the former indicates that satisfactory service is not being given to customers. It is desirable, therefore, to provide facilities for answering these calls and for advising the callers that the called party is not available and that he may leave a message. In this manner, the number of so-called lost calls would be reduced and also the needless tie-up of switching equipment would be eliminated.

In view of the foregoing, a general object of this invention is to reduce both the amount and need of operator assistance in the completion of calls.

The present invention is illustrated herein as embodied in a so-called automatic call distributor system which is fully automatic for most of its functional operations; yet, which requires an operator to assist in the completion of certain types of calls. While this exemplary embodiment of the invention is disclosed in this type of system, it is not intended that it be in any way a limitation of the scope of the invention.

A distributor system is primarily utilized for handling telephone calls to frequently called customer numbers, such as department stores, telegraph operators and the like. The calls are normally served at the customer location by a team of operators. The central office serving the frequently called number is connected to the distributor at the customer location by a number of trunks. The application of a ringing signal in the central office to any one of the trunks initiates the operation of the distributor switching gear to connect the rung trunk to an idle operator position circuit for serving call.

The main object of this invention is generally to improve call distributor systems in a number of ways and particularly provide a new intercept service that relieves operators serving the system of the duty of supplying routine announcement services heretofore often required during the completion of calls.

Another, and more particular object of the invention is to provide facilities for increasing the traffic handling capacity of operators.

Another object of the present invention is to provide a distributor system with improved efficiency.

A further object of this invention is to provide improved intercept services.

Still another object of this invention is to provide facilities for handling calls during the period when the distributor is unattended.

A principal advantage of the present invention is that it affords better telephone service than was heretofore provided by distributor systems. The improved service is rendered both during attended and unattended periods of the system operation and is resultant from the use of more automatic equipment arrangements for handling calls. For example, intercept and announcement arrangements are provided for use during the attended period of the system to facilitate the prompt answering of calls, the early release of the ringing equipment and control gear associated therewith at the central office and, in addition, to aid in expediting calls while relieving operators of the duty of supplying routine announcement services. As a result of the prompt answering of calls, a caller receives better service and is very likely to form a good impression of the called party's business practices. The early release of the ringing equipment reduces the holding time of and the load on that equipment and allows for economies in the central office plant equipment. Relieving the operator of the announcement duties permits her to handle more calls where her assistance is essential to the completion of calls. In the absence of the customary operators, intercept-automatic answering and message recording equipment is provided to facilitate the completion of calls, to reduce the number of lost calls, and to eliminate the need for the usual facilities for alarm signaling and emergency answering heretofore provided in such systems.

The general features of the present invention whereby the foregoing objects are attained, and whereby departures from prior techniques result, are contained in a distributor system utilizing intercept facilities for automatically handling part of a call heretofore manually handled in such systems, for supplying automatically during this part recorded announcements relating to general information, advertising, etc., and for switching to an operator that part of a call to be handled manually.

A particular feature of the present invention which is included in the new intercept facilities is the provision of an individual intercept circuit for each trunk extending between the central office and the distributor system. Each circuit utilizes relay circuit arrangements for intercepting, or answering, an incoming call; for controlling the extension of the call to announcement facilities; and for controlling the application of a signal condition to an associated trunk circuit to initiate its operation.

Another feature of this invention related to the immediately previous one is the provision of common control circuitry that operates in conjunction with all of the aforementioned intercept circuits to control the connection of calls from intercept circuits to announcement equipment prior to the routing of these calls to operators. This circuitry includes a number of individual relay circuits which are operative subsequent to the operation of an intercept circuit. One of these circuits includes means for tripping ringing signals from the central office, another is organized to control the operation of the announcement equipment, another is arranged to connect a call from an intercept circuit to the announcement equipment for the purpose of sending the recorded announcement to a calling party. Another circuit is operative under control of an end of announcement signal from the announcement equipment to initiate the operation of other circuits of the distributor system which route the call to an operator for service.

Another specific feature, directly related to the latter, is that the common control circuitry include facilities, which are activated when a call cannot be routed to an operator because of an "all operators busy" condition, for transmitting a recorded message to the caller explaining the reasons for the delay. These facilities include apparatus activated by an intercept circuit for starting the operation of an announcement device, and apparatus controlled jointly by that device and the aforementioned announcement equipment for connecting waiting calls to that device to receive the recorded message.

Another feature of this invention is the provision of intercept facilities for handling calls during the time that the distributor system is unattended. These facilities include an intercept control circuit associated with automatic answering and message recording equipment, means for associating this circuit and equipment with one operator position circuit, and means for permitting calls to be directed only to that one position circuit. When a call is routed to the one position circuit, the automatic answering equipment is arranged to transmit the recorded announcement over the switch connections to inform the calling party that the called party is not available and to solicit a message from the caller and then to record the message if one is given. Means are also provided in the control circuit for discontinuing the first mentioned intercept announcement service during unattended periods.

The foregoing objects, advantages, and features of the present invention as well as others will be apparent from the subsequent descriptions of the exemplary embodiment thereof shown in the drawings.

A clear and complete description of the invention is facilitated by reference to the eight sheets of drawings which show, in block and schematic diagrams, the exemplary call distributor system in which the invention and its features are embodied.

In the accompanying drawings:

FIG. 1 illustrates in block diagram form the switching plan of the exemplary distributor system;

FIG. 2 illustrates intercept circuits associated with the trunks interconnecting the central office of the distributor system. The intercept circuit designated 2IN15 is one of 16 intercept circuits 2IN00–15 and is shown in schematic detail. The circuit 2IN00 is shown in block diagram form and the circuits 2IN01–14 are not shown;

FIG. 3 illustrates the incoming trunk circuits associated with the intercept circuits. The trunk circuit 3TR15 is one of 16 trunk circuits 3TR00–15 and is shown in schematic detail. The circuit 3TR00 is shown in block diagram form and circuits 3TR01–14 are not shown;

Figures 1, 9:
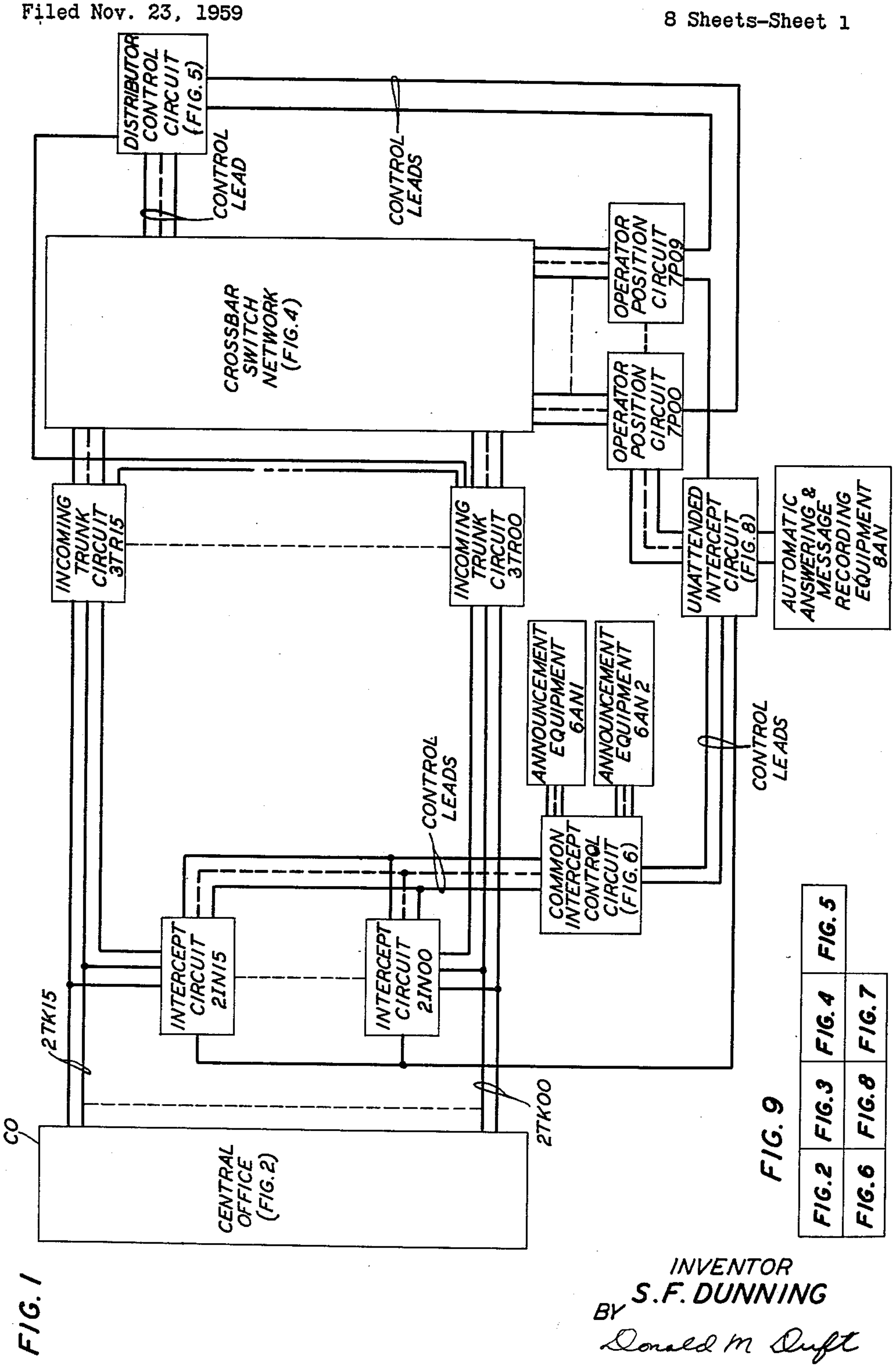
Figure 7:
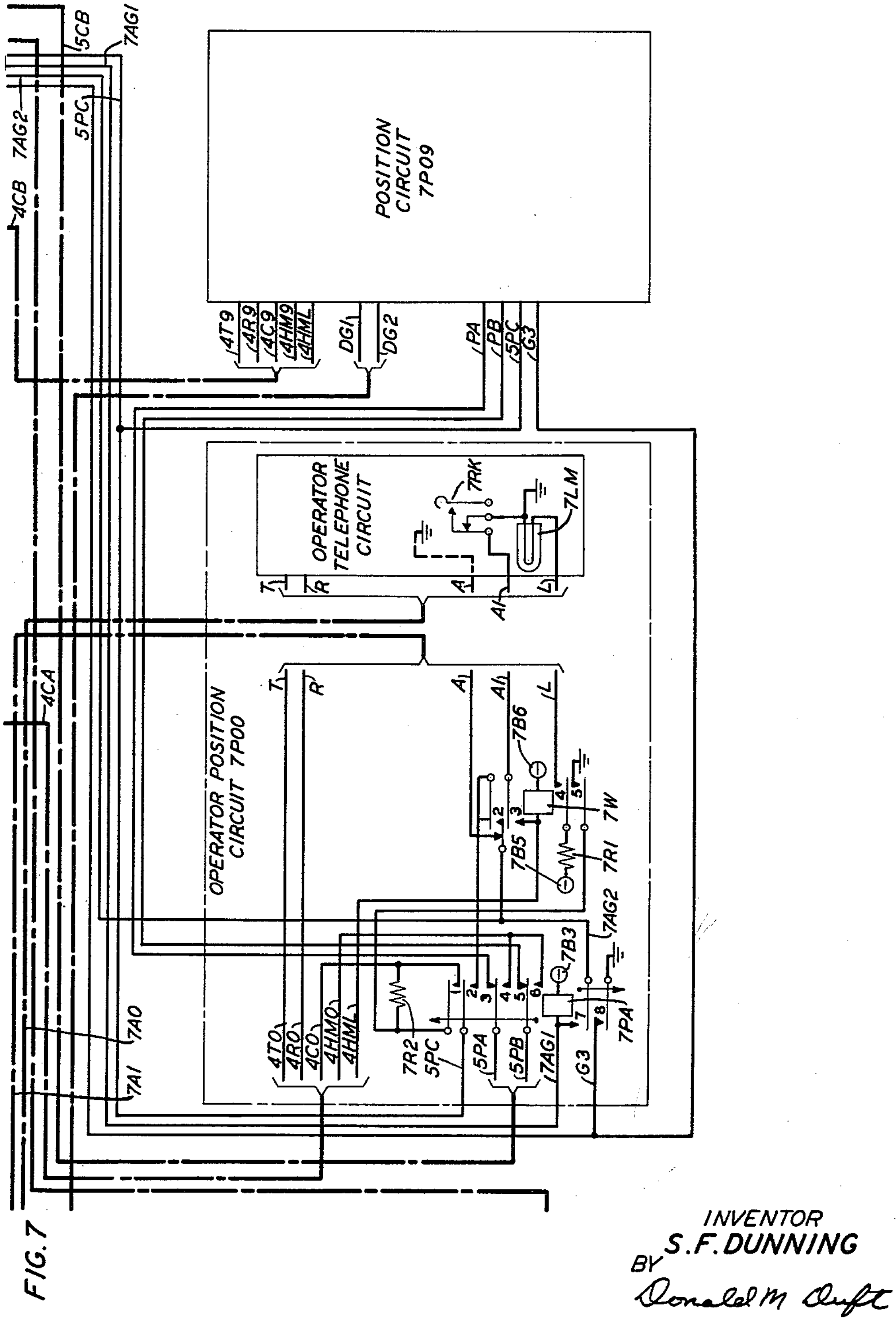
Figure 8:
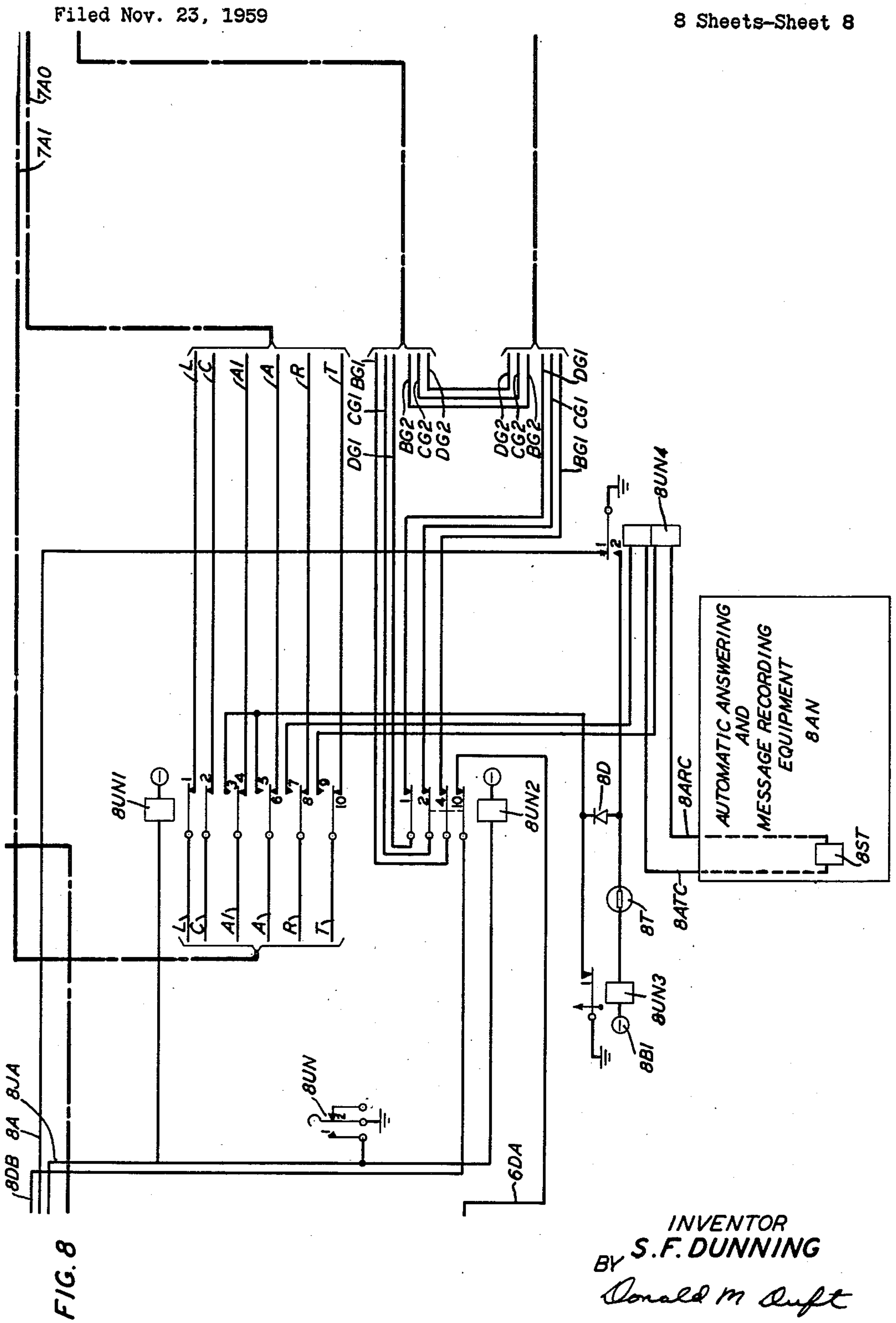

FIG. 7 illustrates the operator position circuits. Position circuit 7P00 is one of the ten position circuits 7P00–9 and is shown in schematic detail. Circuit 7P09 is shown in block diagram form and circuits 7P00–8 are not shown;

FIG. 8 illustrates in schematic form the unattended intercept circuit, and in block diagram form the automatic answering and message recording equipment; and FIG. 9 illustrates the position in which FIGS. 2 to 8, inclusive, should be placed to show an operative arrangement.

In the following description, functional designations have been used. Each includes an indication of the figure in the detailed circuit drawings in which the unit appears, and generally also an indication of the function of the unit. For example, the first digit 2 of the designation 2TK00 in FIG. 1 indicates that it also appears in FIG. 2 of the detailed circuit drawings, and the letters "TK" indicate the designation is of a trunk.

GENERAL DESCRIPTION

The distributor switching plan is designed to provide for the interconnections between central office circuits and operator position circuits for the purpose of completing calls. Referring to FIG. 1, the central office CO is connected to the distributor system by a number of trunks designated 2TK00–15. The central office includes the usual facilities of switching gear, ringing and battery supplies, etc., for extending telephone calls to these trunks. Each of the trunks 2TK00–15 is terminated at the distributor in one of 16 intercept circuits 2IN00–15 and in one of the 16 incoming trunk circuits 3TR00–15. The circuits 2IN00–15 are associated with a common intercept control circuit, which in turn functions in conjunction with the announcement equipments 6AN1 and 6AN2. The distributor employs a crossbar switch network that operates under control of the incoming trunk circuits, a distributor control circuit, and a group of operator position circuits 7P00–09. The unattended intercept circuit is arranged for association with the position circuit 7P00, the automatic answering and message recording equipment 8AN, the common intercept control circuit, and each of the intercept circuits 2IN00–15 during the unattended periods.

By giving reference to the block diagrams of FIG. 1, and to the following brief descriptions of typical calls, a general understanding may be gained of the functional operations involved in establishing connections between calling parties and an operator or the automatic answering and message recording device. A telephone call from the central office to a customer served by the distributor is originated in the usual manner. The central office functions also in the usual manner to connect the call to one of the trunks 2TK00–15 to the distributor and to supply a ringing signal thereto. The ringing signal operates the intercept circuit associated with the rung trunk, which in turn operates the common intercept control circuit. The latter circuit functions to trip the incoming ringing signal, to apply a supervisory holding condition for equipment at the central office, and to connect the call to the announcement equipment 6AN1. A recorded message is then reproduced and transmitted from the equipment 6AN1 over the switch connections to the calling party. This message announcement is primarily intended to include routine information messages which are regularly supplied by operators. At the end of the announcement, the equipment 6AN1 signals the intercept control circuit to route the call to an operator for service if no other calls are awaiting service. If other calls are awaiting service, however, or if for some other reason there is to be an extended delay (such as when all operators are busy handling other calls), the intercept control circuit connects the call to the announcement equipment 6AN2. The latter, after a prescribed delay, then reproduces and transmits a recorded message to all calling parties awaiting service. This message informs the callers of the delay. When the system is prepared to route the call to an operator, that is, when no other call with preference over the exemplary one is awaiting service, the incoming trunk circuit associated with the rung trunk, the distributor control circuit, the crossbar switch network, and one of the available operator position circuits operate to connect the call to an operator for service.

During the periods that an operator is not attending the distributor system, an unattended intercept service is available. The unattended intercept circuit is manually brought into service by the operation of a key (not shown). The circuit operates to cancel the operation of the intercept control circuit and hence the foregoing announcement services on calls, to exercise certain control functions over the circuits 2IN00–15 and the associated circuits 3TR00–15, to make position circuit 7P00 available for serving calls, and to cancel subsequent operations of the position circuits 7P01–09. Thereafter, when an incoming call is connected to one of the trunks 2TK00–15 and ringing is applied, the associated intercept circuit operates and proceeds immediately to operate the associated trunk circuit (without any announcement being made) and to route the call through the switch network to the position circuit 7P00. In the meantime, ringing is not tripped and the intercept circuit associated with the rung trunk is held operated under control of the unattended intercept circuit. The ringing signal is connected through the circuit 7P00 and the unattended intercept circuit to the equipment 8AN. This signal operates the unattended intercept circuit, which in turn effects the release of the intercept circuit associated with the rung trunk. The same signal operates the automatic answering and message recording equipment 8AN, which then sequentially operates to trip the ringing signal, to reproduce and to transmit a recorded announcement that informs the caller that the called party is not available and that solicits a message from the caller, to receive and to record a message, if one is given, and thereafter to signal the circuit 7P00 to initiate the release of the system. After the release of the system, other calls may be served.

*Detailed Description.—Intercept Service During Attended Periods*

Referring now to the detailed circuit representation shown in FIGS. 2 to 8, inclusive, as arranged in accordance with FIG. 9, the operation of the circuits in extending a call from the central office circuits over one trunk to an operator will be described. Assume that, in the usual manner, a customer has originated a call through the central office CO to the customer served by the distributor system and that the central office has connected the call to a trunk connecting the distributor and the central office. The sequence of operations for extending a connection through the distributor is initiated when ringing current is applied across the tip and ring leads of one of the trunks 2TK00–15. Assume further, for example, that trunk 2TK15 is utilized for the call. The central office CO includes the usual facilities, including the switching gear, ringing supplies, battery and ground supplies, etc., for extending a connection to the trunks 2TK00–15 and for applying ringing current thereto. At the same time that ringing current is applied to trunk 2TK15 by the central office CO, a ground potential is also applied from the central office CO to the tip lead 2T15 of the trunk 2TK15.

The ringing signal applied to trunk 2TK15 operates a ring relay 2R in the intercept circuit 2IN15. The circuit 2IN15 is one of 16 intercept circuits in the distributor system, which are respectively connected to the trunks 2TK00–15. In addition to the 16 circuits 2IN00–15 in the distributor, which are connected to the trunks 2TK00–15, the distributor includes 16 incoming trunk circuits 3TR00–15 which are also connected to the trunks 2TK00–15. As is hereinafter described, the circuitry of the circuits 3TR00–15 is arranged such that only the associated one of the circuits 2IN00–15 operates responsive to a ringing signal on one of the trunks 2TK00–15.

The operating path for the relay 2R in the circuit 2IN15 is from the ring lead 2R15 of the trunk 2TK15 through contact 5 of the relay 2A, a capacitor 2C shunted by the resistor 2RA, the lower winding of relay 2R, and contact 7 of relay 2A to the tip lead 2T15 of the trunk 2TK15. When relay 2R operates, it closes a locking path through its upper winding and it operates the trip ringing relay 6TP. The locking path is from battery 2B1 through the upper winding and contact 7 of relay 2R, and contact 1 of relay 2A to ground. The operating path for relay 6TP extends from battery 6B1 through the winding of relay 6TP, contact 3 of relay 6C in parallel over leads AG1 and AG2 of cable 3CA through contact 00 of the trunk gate relay 5TG, contact 1 of relay 6RS, contact 2 of relay 6J, over lead 2A2, contact 2 of relay 2R, and contact 3 of relay 2A to ground. When relay 6TP operates, it readies a path for tripping ringing in the central office CO, and it completes a path for operating relay 6C. This latter path extends from battery 6B2 through the winding of relay 6C and contact 7 of relay 6TP to ground. When relay 6C operates, it closes a locking path for itself; completes operating paths for the relay 2A in the circuit 2IN15, relay 3R in the trunk circuit 3TR15, and the gate relay 5TG in the distributor control circuit; and opens the operating path for relay 6TP. The locking path for relay 6C is from battery 6B2 through the winding and contact 7 of relay 6C, contact 4 of relay 6J, and contact 2 of relay 6RS to ground. Relay 2A operates in a path from battery 2B2 through the winding of relay 2A, diode 2D, contact 1 of relay 2R, over lead 2A3 to FIG. 6, contact 1 of relay 6TP, and contact 1 of relay 6C to ground. This same ground, which is extended to the winding of relay 2A is extended over lead 2S15 to the winding of relay 3R in the trunk circuit 3TR15 to operate it. Relay 3R operates and locks to ground supplied through its contact 1 via resistor 3R1 and contact 2 of relay 3T in the trunk circuit 3TR15. This same locking path is extended back over lead 2S15 to lock operated relay 2A in the circuit 2IN15. As described hereinafter, the operation of relay 3R is utilized for preparing the trunk for connection to an idle operator position circuit.

As indicated above, the operation of relay 6C completes a path for operating relay 5TG in the distributor control circuit. This path is from battery 5B1 through the winding of relay 5TG, over lead 6G of cable 3CA into FIG. 6, and contact 2 of relay 6C to ground. If, however, the trunk gate is already operated, as hereinafter described, during the connection of another call to an operator position circuit, this last mentioned path is but a supplementary operating path for relay 5TG. When relay 5TG is operated and when, as described below, the 6TP relay releases, the admittance of subsequent calls to the intercept common control circuit is blocked and those calls do not proceed beyond the respective intercept circuits 2IN00–14. All subsequent calls proceed to the point of applying and maintaining the ringing signal to the particular one of the trunks 2TK00–14 to be used for the call and operating the relay 2R in the intercept circuit associated with that trunk.

As also indicated above, when relay 6C operates, it opens the operating path for relay 6TP at its contact 3 and causes it to release. Relay 6TP is a slow releasing device which permits relay 2A in the circuit 2IN15, relay 3R in the circuit 3TR15, and relay 5TG in the control circuit to operate before it releases. When relay 6TP releases, the call on trunk 2TK15 is connected through to the announcement equipment 6AN1 and a path is completed to start the operation of the equipment 6AN1.

When relay 2A operates, ringing is tripped in the central office CO due to a shunt connection across the leads 2T15 and 2R15 of the trunk 2TK15. This connection is from tip lead 2T15 of trunk 2TK15 through contact 4 of relay 2A, resistor 2RB, contact 3 of relay 2R, over lead 2A1 to FIG. 6, contacts 2 and 4 of relay 6TP, over lead 2A0 to FIG. 2, contact 5 of relay 2R, resistor 2RC, and contact 6 of relay 2A to lead 2R15 of trunk 2TK15. This shunt connection completes a path for operating the ringing tripped relay (not shown) associated with trunk 2TK15 at the central office. This relay operates and transfers the tip and ring leads 2T15 and 2R15 of trunk 2TK15 from the ringing supply to a ground and battery supply. The potentials connected over these leads are then used for purposes of talking and supervisory control. The tip lead 2T15 is connected to ground and the ring lead 2R15 to battery.

The operation of relay 2A opens the aforementioned locking path for relay 2R in the circuit 2IN15 at its contact 1 and recloses another locking path for relay 2R. The latter path is from battery 2B1 through the upper winding of relay 2R, contact 7 of relay 2R, contact 2 of relay 2A, over lead 2A4 to FIG. 6, contact 4 of relay 6J, and contact 2 of relay 6RS to ground.

The operation of relay 2A also completes a path for operating relay 6ST. This path is from battery 6B4 through the winding of relay 6ST, over lead 6DA to FIG. 8, contact 10 of relay 8UN2, over lead 8DB to FIG. 6 and thence to FIG. 2, and contact 8 of relay 2A to ground. Relay 6ST functions as part of the control circuitry associated with the announcement equipment 6AN2. The operations of the latter circuitry is described in subsequent paragraphs.

The circuit action to be described presently is that caused upon the operation of the announcement equipment 6AN1 and upon the connection of the call on trunk 2TK15 thereto. Hence, it is deemed advisable at this point to present a short explanation of the equipment 6AN1 in order to explain its role in the system. The equipment 6AN1 may be similar to the answering or talk-out mechanism and circuitry disclosed in Patent 2,846,505, granted August 5, 1958 to C. R. Keith et al. and in the related Patent 2,761,899, granted September 4, 1956 to C. R. Keith et al. provided that the modifications hereinafter set forth are made. The mechanism and circuitry are utilized for three main functions. These are: to record the message to be transmitted, to check the message, and to reproduce and transmit the message to a calling party. The exemplary embodiment of this invention is directed primarily to the last of these functions. Since the details of this mechanism are presented in the above patents, the following description will be limited to that portion of the equipment necessary for an understanding of the present invention. Referring now to the block diagram of FIG. 6, the circuit which includes the adjustable limit switch 6ALS1 and relay 6ST1 is used to control the operation of the equipment 6AN1. The relay operate path extends from ground through contact 1 of the adjustable limit switch, over lead 6STB, contact 6 of relay 6TP, contact 6 of relay 6C, over lead 6STA, and the relay winding of relay 6ST1 to battery. Relay 6ST1 corresponds to relay 32 of the C. R. Keith et al. Patent 2,846,505. The circuit arrangement of the latter relay has been modified for purposes of the present invention to include the above described path of FIG. 6. With this arrangement, the operation of the equipment 6AN1 is initiated by the closure of the operate path for relay 6ST1 under control of relays 6TP and 6C. The functions of the apparatus and circuitry of the equipment and its mode of operation after the operation of relay 6ST1 are essentially the same as described in the aforementioned patents with the following exception. At the end of the announcement transmission (a cycle of operation), the adjustable limit switch 6ALS1 is operated automatically and ground is connected over lead 6RSA to operate, as hereinafter described, relay 6RS.

Figure 6:
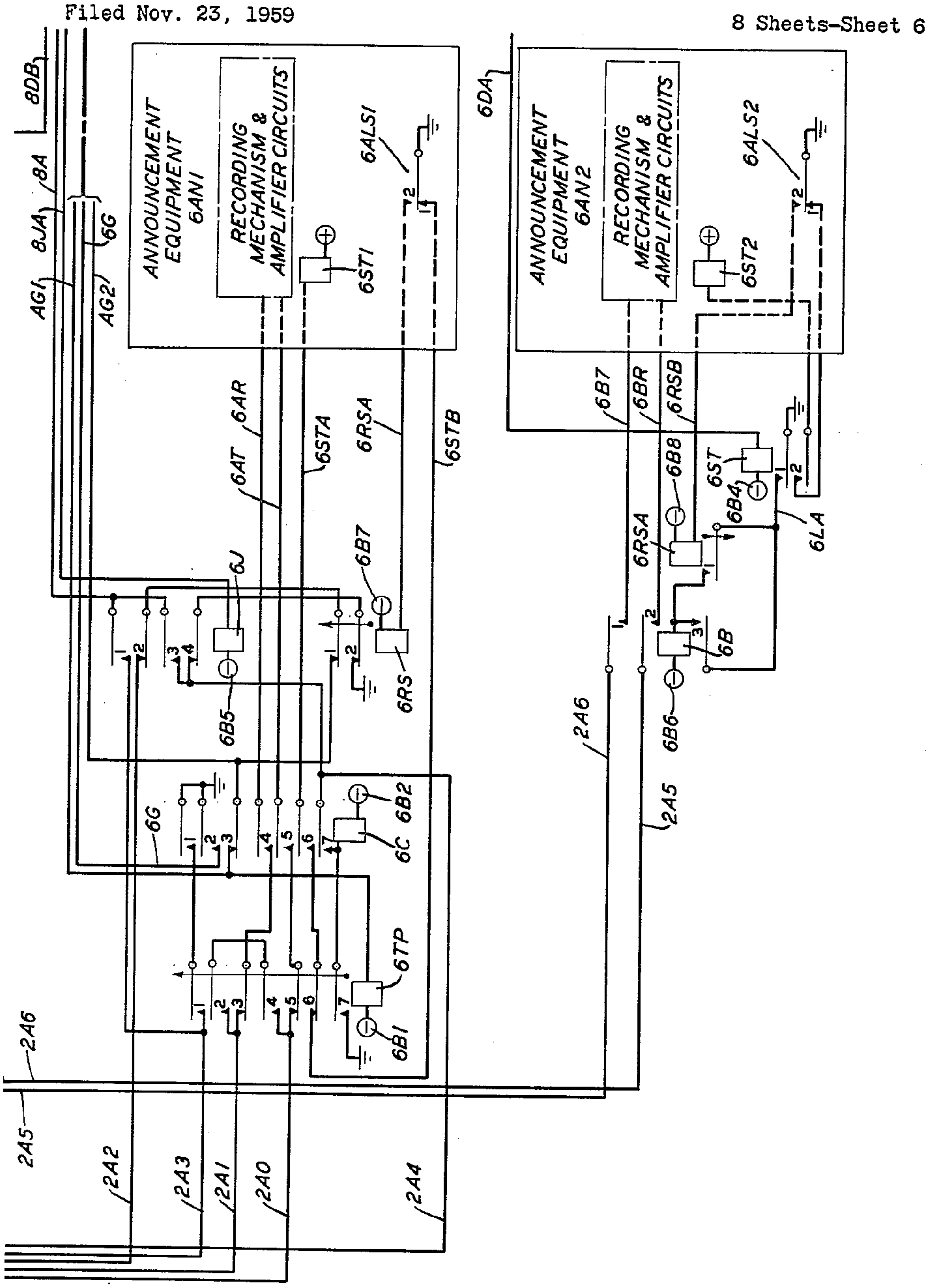
FIG. 6 illustrates in schematic form the common intercept control circuit and in block diagram form the announcement equipments.

Returning now to the connecting sequence, the call on trunk 2TK15 is connected over a path which extends from the tip lead 2T15 of trunk 2TK15 through contact 6 of relay 2A, resistor 2RC, contact 5 of relay 2R, over lead 2A0 to FIG. 6, contact 5 of relay 6TP, contact 5 of relay 6C, and the tip lead 6AT to the equipment 6AN1; and over a path which is from the ring lead 2R15 of trunk 2TK15, contact 4 of relay 2A, resistor 2RB, contact 3 of relay 2R, over lead 2A1 to FIG. 6, contact 3 of relay 6TP, contact 4 of relay 6C, and the ring lead 6AR to the equipment 6AN1.

The above-mentioned path, completed to start the operation of the announcement equipment 6AN1, is from lead 6STA through contact 6 of relay 6C and the contact 6 of relay 6TP to lead 6STB. The completion of this path causes the operation of relay 6ST1, which in turn initiates the operation of the other control circuitry (not shown) within the announcement equipment 6AN1. The recording mechanism and amplifier circuitry of the equipment 6AN1 functions, at the proper time, to reproduce a prerecorded message for transmission over the leads 6AT and 6AR and the above described path to the calling party. This message may be prerecorded in the usual manner by an operator or by the customer served by the distributor and may relate to general information, advertisement, and the like.

After the announcement is completed, control circuitry (not shown) within the announcement equipment 6AN1 momentarily operates the adjustable limit switch 6ALS1 which in turn connects ground through its contact 2 over lead 6RSA to momentarily operate the restoral relay 6RS and thereby initiate a sequence of operations for ultimately connecting the incoming call on trunk 2TK15 to an idle operator position circuit. The operation of switch 6ALS1 causes the release of relay 6ST1 by opening that relay's operating path at its contact 1. When relay 6RS operates, it opens at its contact 2 the locking paths, hereinbefore described, for relay 2R in the circuit 2IN15 and relay 6C. These relays then release.

The release of relay 2R in the circuit 2IN15 switches the tip lead 2T15 and the ring lead 2R15 of trunk 2TK15 to leads 2A6 and 2A5, through its contacts 4 and 6, respectively. Resistor 2RD is connected across these leads and provides a supervisory hold condition on the trunk 2TK15 back to the central office until the call is distributed to an operator. As will be described hereinafter, the relay switching circuits of FIG. 6, that are associated with leads 2A6 and 2A5 and the announcement equipment 6AN2, are utilized if the distributor switching circuits are busy processing other calls and if operator position circuits are busy and unable to serve calls within a prescribed period of time. These associated circuits are also used to control the transmission of a recorded announcement over switch connections to calling parties. This announcement may relate that some unavoidable delay has occurred and that calls will be answered momentarily.

When, as stated above, relay 6C releases, it disconnects, at its contacts 4 and 5, the announcement equipment 6AN1 from the tip and ring leads 2T15 and 2R15 of trunk 2TK15; opens, at its contact 1, the operating circuits for relays 2A and 3R (these relays, as hereinbefore described, are locked operated and therefore do not release at this time); and opens, at its contact 2, an operating circuit for the trunk gate relay 5TG.

The release action of relay 6ST1 causes the equipment 6AN1 to return to normal, that is, to the condition assumed prior to the operation of relay 6ST1. The equipment 6AN1 is then made available for serving subsequent calls. After the momentary operation of the 6RS relay and the release of relay 6C, the switching gear of FIG. 6, associated with circuits 2IN00–15 and the announcement equipment 6AN1, is ready to handle other incoming calls.

If relay 5TG was not operated for connecting calls other than the instant exemplary one to operator position circuits, the opening of its aforementioned operating path under control of relay 6C would cause it to release. Provided this were the case, the release of relay 5TG would reclose the trunk gate to initiate, as hereinafter described, further operations in the trunk circuit 3TR15 that would result in the connection of the call on trunk 2TK15 to an idle operator position circuit. However, if a number of other incoming calls are already connected to some of the incoming trunk circuits 3TR00–14 (assume that each of these calls was connected thereto in essentially the same manner as the exemplary one) and are awaiting connection to an operator position circuit, and if these calls have service preference over the instant exemplary one, relay 5TG remains operated. The circuits controlling the operation of relay 5TG will be described in detail hereinafter.

When such a delay is encountered in connecting a call to an idle operator position circuit, the circuits of relays 6B, 6RSA, and 6ST, and of the announcement equipment 6AN2, are operative to monitor how long it is taking for incoming calls to be processed through the distributor to position circuits. If the time involved exceeds a prescribed interval, these circuits are also operative to control the transmission of a recorded message from the announcement equipment 6AN2 to all of the calling parties who have already received an announcement from the equipment 6AN1 and who are still awaiting a connection to an operator to inform them that a slight delay has occurred in handling calls and that they will be served momentarily.

At this point, a few remarks are considered necessary to explain the general characteristics of the announcement equipment 6AN2. The announcement equipment suitable for use in the exemplary embodiment of this invention may be of various types. The particular design adapted and used herein for illustrating the present invention is a slightly modified version of the talk-out mechanism and control circuitry disclosed in Patent 2,846,505, granted August 5, 1958 to C. R. Keith et al. and in the related Patent 2,761,899, granted September 4, 1956 to C. R. Keith et al. The circuitry thereof is modified in exactly the same manner as specified hereinbefore for the equipment 6AN1, and its mode of operation is essentially the same.

Figure 2:
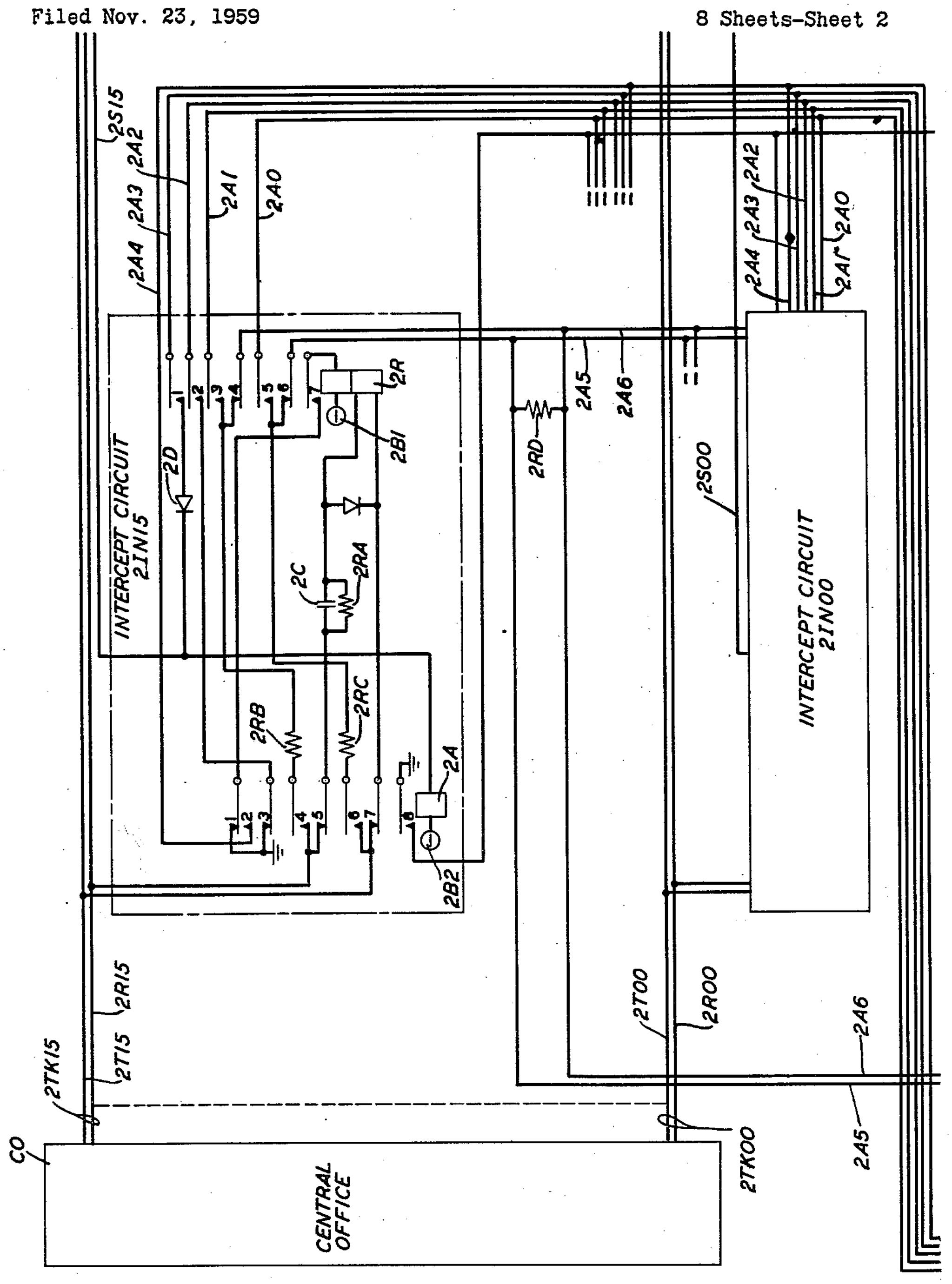
Figure 3:
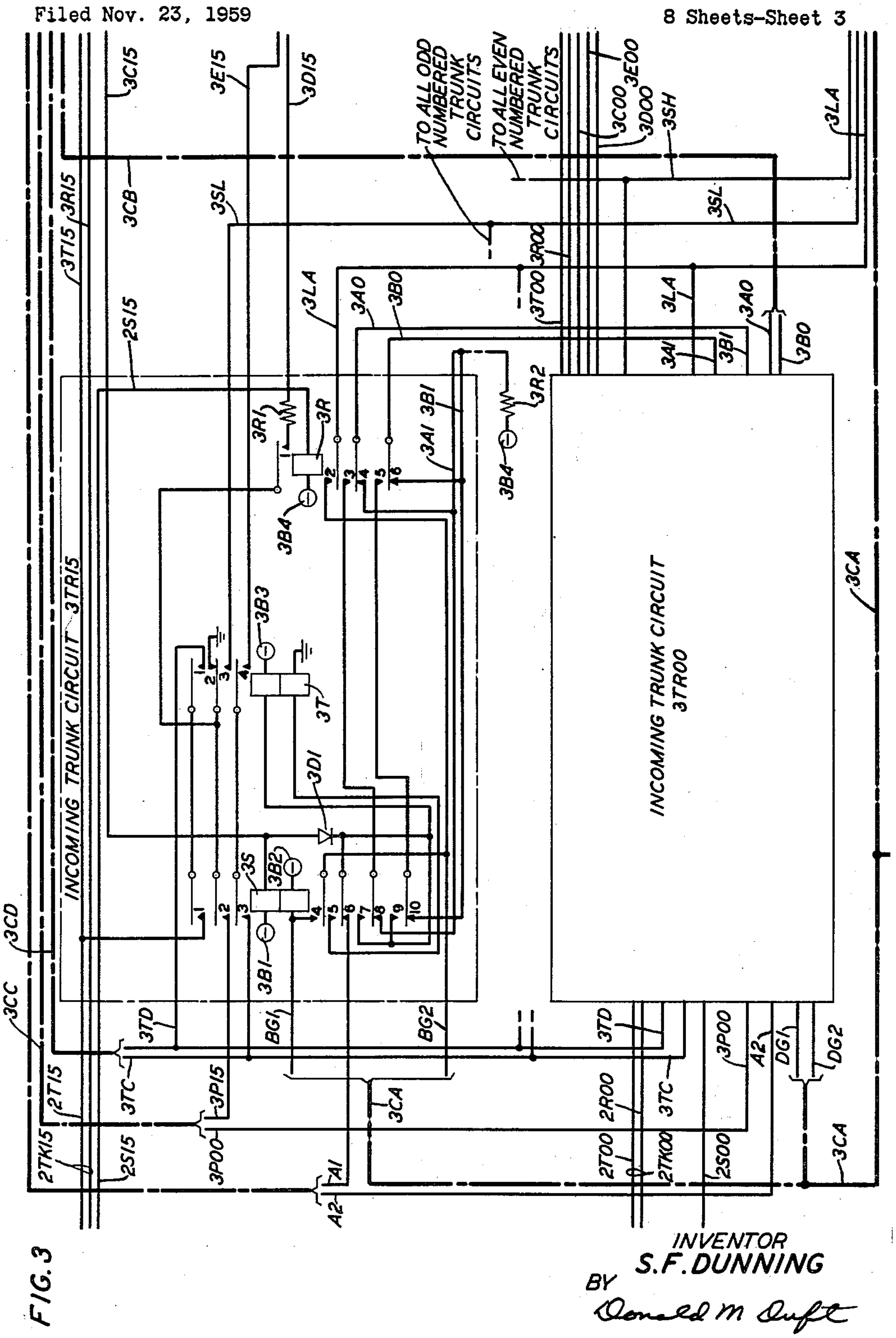
Figure 4:
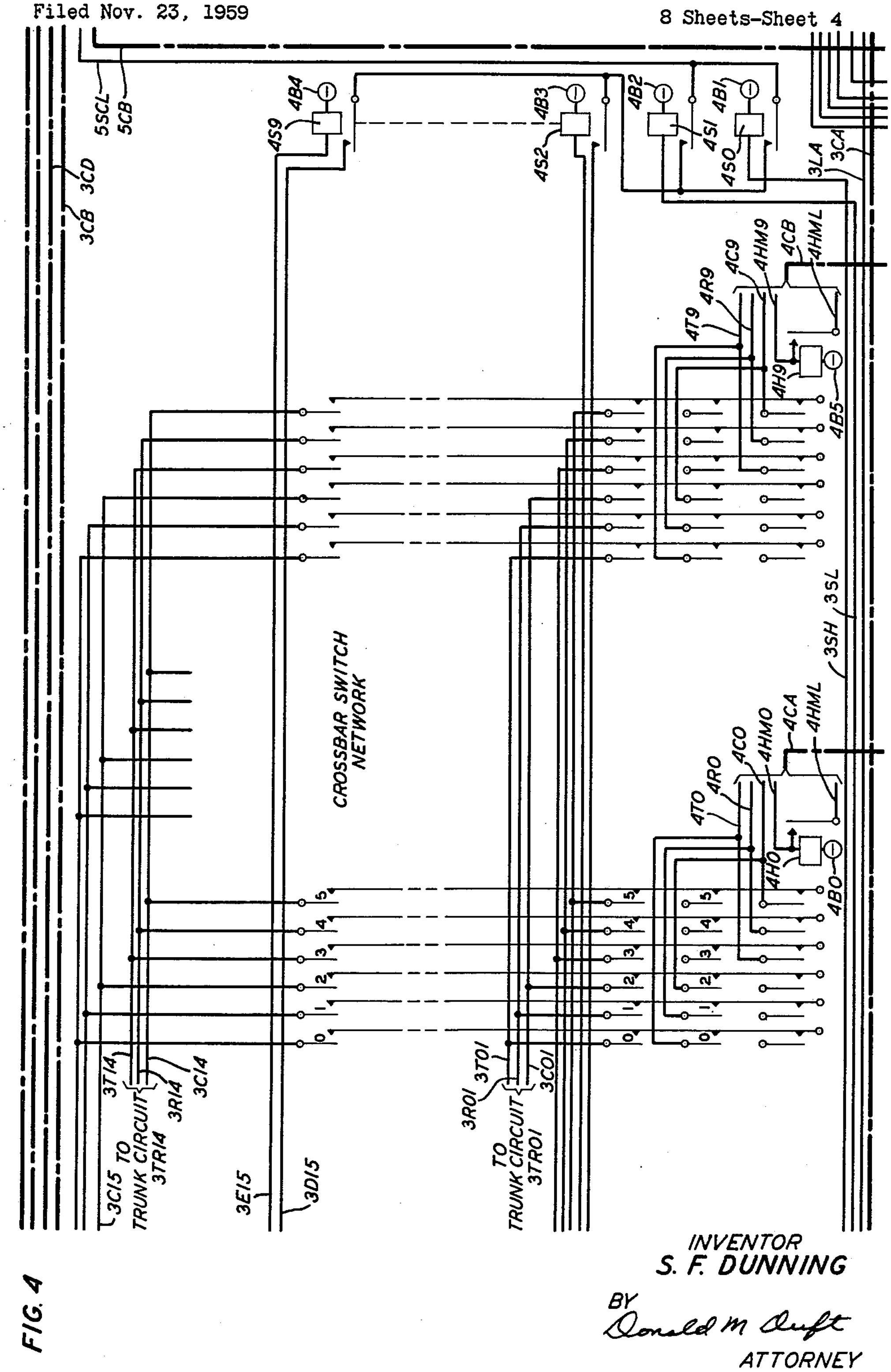
FIG. 4 illustrates a skeletonized crossbar switch network.
Figure 5:
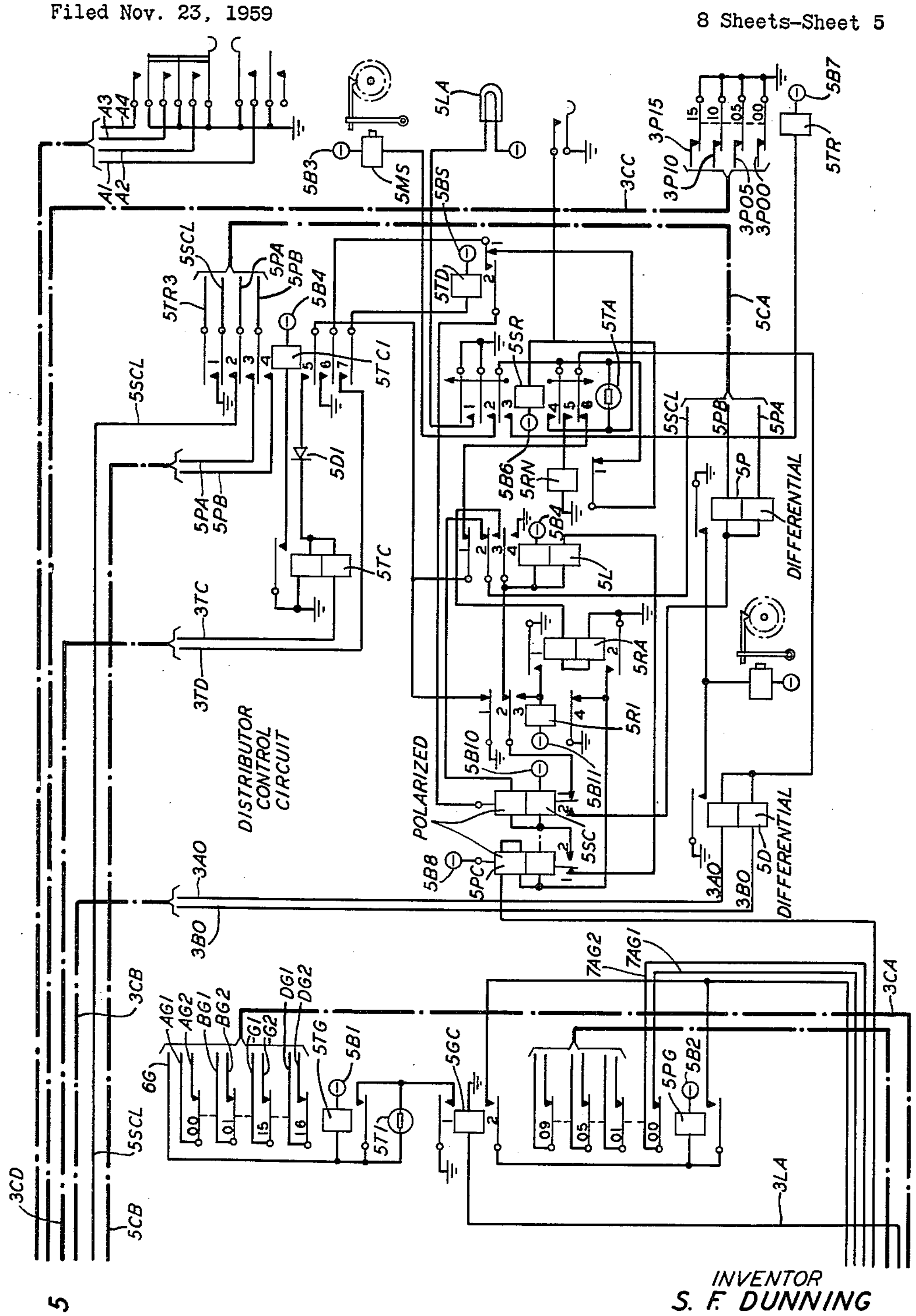
FIG. 5 illustrates the distributor control circuit.

Returning now to the connecting sequence, described hereinbefore, it may be recalled that relay 6ST is operated at the beginning of an incoming call in a circuit which extends from battery 6B4 through the winding of relay 6ST, over lead 6DA to FIG. 8, contact 10 of relay 8UN2, over lead 8DB to FIG. 2, and through contact 8 of relay 2A in the intercept circuit engaged on the incoming call.

When relay 6ST operates on an incoming call, it closes a path through its contact 2 for causing the operation of relay 6ST2 within the equipment 6AN2. Relay 6ST2 in turn initiates the operation of other control circuitry (not shown) of equipment 6AN2. The operations of equipment 6AN2 may be functionally divided, for illustrating this particular announcement service of the distribution system, into two separate cycles of operation. These are: a first, or initial, cycle during which timing and control operations are performed and an announcement is reproduced but is not transmitted to callers because switch connections are not yet established therebetween; and a second cycle during which the first operation of the equipment is repeated and a recorded announcement is reproduced and transmitted over established switch connections to callers. The latter cycle of operation is repeated as long as relay 6ST2 remains operated under control of the above-mentioned path. The first cycle is designed to permit awaiting calls to be processed through the system in the normal manner and within a prescribed interval set forth by local traffic handling requirements. This interval being the period required to complete one cycle of the equipment 6AN2 operation. The operation thereof is controlled by such factors as the length of the message to be transmitted, the time required to restore the equipment to normal after an announcement, etc. For purposes of illustration, assume that the first cycle of operation is 30 seconds in duration and that the second is also 30 seconds. In the event that an incoming call is not connected to an operator position circuit at the end of the reproduction of the announcement during the first cycle, relay 6ST remains operated and equipment 6AN2 momentarily and automatically operates the adjustable limit switch 6ALS2 which in turn connects ground over lead 6RSB to momentarily operate relay 6RSA. When relay 6RSA operates, it completes a path from battery 6B6 through the winding of relay 6B, contact 1 of relay 6RSA, and contact 1 of relay 6ST to ground, thereby operating relay 6B. Relay 6B locks operated through its contact 3 under control of relay 6ST; and connects leads 2A5 and 2A6 to leads 6BT and 6BR, respectively, which are associated with the announcement equipment 6AN2. Since leads 2A5 and 2A6 are multiple-connected to all of the intercept circuits 2IN00–15, the last-mentioned connection associates the announcement equipment 6AN2 with all of the circuits 2IN00–15. When switch 6ALS2 operates, as mentioned above, it opens the operate path for relay 6ST2 at its contact 1. Relay 6ST2 then releases to restore the equipment 6AN2 to the condition assumed prior to the operation of relay 6ST2. When the restoration is completed, the switch 6ALS2 releases and causes the reoperation of the control circuitry (not shown) of equipment 6AN2 to start its second cycle of operation (this cycle actually being a recycle of the first operation). If any of the aforementioned incoming calls are still awaiting connection to an operator position circuit at the beginning of the second cycle of operation, the recording mechanism and amplifier circuits within the equipment 6AN2 function to reproduce a prerecorded message for transmission over leads 6BT and 6BR to the calling parties awaiting service via the intercept circuits, the associated trunks, and the central office circuits (not shown). For example, this message is sent from the recording mechanism and amplifier circuit over leads 6BT and 6BR through contacts 1 and 2 of relay 6B, over leads 2A5 and 2A6 into FIG. 2, contacts 4 and 6 of relay 2R in circuit 2IN15, resistors 2RB and 2RC, and contacts 4 and 6 of relay 2A to leads 2T15 and 2R15 of trunk 2TK15. The transmitted message may relate to information such as, "You have reached the called party; however, there will be a slight delay before your call is answered." The announcement equipment 6AN2 thereafter causes this information to be repeated approximately every 30 seconds as long as relays 6ST and 6B remain operated. Subsequent operations of the equipment 6AN2 are essentially the same as described above. When relay 6ST releases, however, as described hereinafter, it opens the path, at its contact 2, which initiated the operation of relay 6ST2 of the equipment 6AN2. The release of relay 6ST2 causes the equipment 6AN2 to return to the condition assumed prior to the initial operation of relay 6ST2 and hence to be available for service on subsequent calls. The release of relay 6ST also causes the release of relay 6B by opening the locking path for that relay at its contact 1.

If, on the other hand, a number of incoming calls are not connected to the incoming trunk circuits 3TR00–14, relay 5TG in the distributor control circuit releases when its hereinbefore described supplementary operating path is opened. When relay 5TG releases, it in turn causes the operation of the seizure relay 3S in the trunk circuit 3TR15 and a gate control relay 5GC in the distributor control circuit. The windings of relays 5GC and 3S are serially connected over a path from ground at the winding of relay 5GC through a lead 3LA, contact 2 of relay 3R, a lead BG2 of cable 3CA, contact 01 of gate relay 5TG, a lead BG1 of cable 3CA, and the lower winding of relay 3S to battery 3B2. Relay 3S and the relay 5GC are in this manner serially operated by relay TG.

Upon operating, relay 3S in the circuit 3TR15 locks itself operated and it operates the differential relay 3T which is also in circuit 3TR15. The locking path for relay 3S is from battery 3B2 through the lower winding of relay 3S, contact 4 of relay 3S, contact 2 of relay 3R, and lead 3LA to the grounded winding of relay 5GC. In this manner, relay 3S locks to ground through a path that shunts the portion of its operating path through contact 01 of relay 5TG. When, as hereinafter described, the gate relay 5TG is operated, it prevents the admittance of subsequent calls by opening the operating paths for all 16 relays 3S. All other 3S relays in the trunk circuits 3TR00–14 cannot operate subsequent to the operation of the trunk gate relay 5TG because their operating paths are through contacts 02–16 of relay 5TG.

When relay 5GC operates, it connects ground through its contact 1, a thermistor 5T1, and the winding of relay 5TG to battery 5B1 causing relay 5TG to operate. The thermistor 5T1 delays the operation of relay 5TG by holding the current through the winding of relay 5TG below its operate value for an interval after path closure. As indicated above, the operation of relay 5TG opens the operating paths for all relays 3S in the circuits 3TR00–14 so that these relays cannot operate. The relay 3S in trunk circuit 3TR15 is, however, locked operated. Relays 5TG and 5GC form a gate circuit which controls the manner in which calls arriving on trunks 2TK00–15 are served.

As indicated above, when relay 3S in circuit 3TR15 operates, it in turn operates relay 3T in the same circuit. Only one of the 16 relays 3T in the circuits 3TR00–15 operates at a time because the relay windings thereof are connected in a preference chain. These relays are connected so that the relay 3T in the lowest numbered trunk circuit has highest preference. Since the only 3S relay operated at this time is that relay in 3TR15, relay 3T in circuit 3TR15 is operated. The operating path for relay 3T is from battery 3B3 through the upper winding of relay 3T, contacts 7 and 9 in parallel of relay 3S, contacts 3 and 5 in parallel of relay 3R, leads 3A0 and 3B0 in parallel; and through the following paths of trunk circuits 3TR00–14, leads 3A1 and 3B1, contacts 4 and 6 in parallel of relay 3R to leads 3A0 and 3B0 in parallel through cable 3CB, the two windings in parallel of the differential relay 5D in the distributor control circuit, contact 6 of a slow release relay 5SR, contact 1 of the differential relay 5L, and contact 1 of a release relay 5R1 to ground. The leads 3A1 and 3B1 of the trunk circuit 3TR15 are multipled through a resistor 3R2 to battery 3B4. When all 16 relays are normal, battery 3B4 is connected through cable 3CB to the windings of the relay 5D in the distributor control circuit. The relay 5D does not, however, operate as long as the same potential is provided across both windings. It, accordingly, does not operate when relay 3T in trunk circuit 3TR15 operates. This arrangement provides an automatic continuity check of the entire preference chain.

When relay 3T in the circuit 3TR15 operates, it readies a path for operating the select magnet 4S9 of the crossbar switch, and it operates select magnet 4S1 of the crossbar switch and relay 5TC in the distributor control circuit.

A short explanation is deemed desirable at this point concerning the crossbar switch mechanism. The exemplary distributor uses a 10 by 10 switch providing 100 crosspoints. It contains ten vertical units and ten horizontal units consisting of five horizontal bars with two select magnets for each bar. One select magnet pulls the bar upwards and the other select magnet pulls it downward, thus providing two horizontal paths for each bar or a total of ten horizontal paths. The crossbar switch horizontals and verticals are arranged so that a total of 16, three-wire links are available for calls. These links are obtained by using eight six-wire horizontals (levels 2 to 9) and choosing either the left half or right half (or upper or lower half, as they may be referred to) of a crosspoint by operating either the 0 or 1 level six-wire crosspoint in combination with one of the 2–9 level six-wire crosspoint. Each vertical unit has ten groups of contacts, one for each horizontal unit associated with it, and a hold magnet. Each of the horizontal units 2 to 9, inclusive, is connected to two of the trunks 2TK00–15 (three-wire connections for each trunk) and each of the horizontal units 0 and 1 is associated with one of the operator position circuits 7P00–09. The normal multiple strappings across corresponding contacts of horizontal levels 0 and 1 are removed on the crossbar switch. Each of the position circuits is connected to the left half of the contacts of level 1 and to the right half of the contacts of level 0. The select magnets 4S0 and 4S1 identify which one of the two trunks connected to a horizontal unit is to be extended to one of the position circuits 7P00–09. A hold magnet, associated with each position circuit and each vertical unit, actuates and holds the connection through the crossbar switch.

As noted above, when relay 3T in trunk circuit 3TR15 operates, it closes a path for operating select magnet 4S1. This path is from ground at the contact 15 of a transfer relay 5TR, lead 3P15 which is part of cable 3CC, contact 2 of relay 3S, contact 3 of relay 3T, lead 3SL, and the winding of the select magnet 4S1 to battery 4B2. The same ground extended to contact 3 of relay 3T passes through contact 1 of relay 3R, resistor 3R1, and in parallel through the winding of relay 3R to battery 3B4 and through lead 2S15 and the winding of relay 2A in circuit 2IN15 to battery 2B2. In this manner, relays 3R and 2A remain locked operated when contact 2 of relay 3T in circuit 3TR15 opens to remove the first locking ground.

As also noted above, when relay 3T in the circuit 3TR15 operates, it readies a path for operating the select magnet 4S9. This path is from battery 4B4 through the winding of select magnet 4S9, lead 3E15, contact 4 of relay 3T, contact 3 of relay 3S, lead 3TC of cable 3CD to FIG. 5, and the windings of relay 5TC to ground. Relay 5TC operates over this path but the impedance of its two windings limits the current through the path so that the select magnet 4S9 does not operate. When relay 5TC operates, it operates the associated relay 5TC1 over a path from ground through the contact of relay 5TC and the winding of relay 5TC1 to battery 5B4. When 5TC1 operates, it shunts the upper winding of relay 5TC by extending a connection from the junction of the two windings of relay 5TC through diode 5D1, contact 5 of relay 5TC1, and contact 1 of relay 5R1 to ground. The shunting of the upper winding of relay 5TC reduces the impedance in the path through the winding of select magnet 4S9 and permits it to operate. With the select magnets 4S1 and 4S9 operated, the trunk 2TK15, which is connected to left or upper half of crosspoints of the crossbar switch horizontal level 9, is readied for connection to any of the operator position circuits 7P00–09. Upon operating, relay 5TC1 closes a connection from the tip lead 2T15 of trunk 2TK15 through contact 1 of relay 3S, contact 1 of relay 3T, lead 3TD of cable 3CD, contact 7 of relay 5TC1, and the winding of relay 5TD to battery 5B5. The ground connected to the tip lead 2T15 of trunk 2TK15 from the central office is then used to check for an abandoned call.

An explanation is advisable at this point to explain the gyrations through which the system goes through if the call is abandoned. If the call on trunk 2TK15 is abandoned, the ground on tip lead 2T15 is removed, relay 5TD does not operate as a result thereof and a sequence of operations occur to return the distributor to normal relative to the call on trunk 2TK15. If the call is abandoned so that relay 5TD does not operate, relay 5TC1 operates a slow operate and slow release relay 5SR to initiate a release operation. The operating path for relay 5SR is from ground through contact 6 of relay 5TC1, contact 1 of relay 5TD, thermistor 5TA, contact 1 of relay 5RN, and the winding relay 5SR to battery 5B6. When relay 5SR operates, it operates a relay 5TR, a message register 5MS, a lamp 5LA, and a relay 5RN. Relay 5TR is operated over a path from ground through contact 6 of relay 5TC1, contact 1 of relay 5TD, contacts 4 and 3 of relay 5SR, and the winding of relay 5TR to battery 5B7. The operation of relay 5TR opens at its contact 15 the operating path for the select magnet 4S1 of the crossbar switch and the locking paths for relay 3R in the circuit 3TR15 and relay 2A of the circuit 2IN15 causing them to release. The message register 5MS is operated over a path from ground through contact 2 of relay 5SR and the winding of the register magnet 5MS to battery 5B3. Upon the operation of register 5MS, it adds a count of one. The register keeps a count of the number of abandoned calls. The lamp 5LA is operated over a path from ground through contact 1 of relay 5SR and the lamp resistance to battery 5B2. The lamp 5LA remains lighted, as long as relay 5SR is operated, to indicate that a release sequence is taking place. With the locking path for relay 3R in circuit 3TR15 open, relay 3R releases, opens at its contact 2 the locking path for relay 3S, and causes relay 3S to release. Relay 3R also opens the operating path at its contact 2 for the gate control relay 5GC which, however, may remain operated if a relay 3S in one of the circuits 3TR00–14 is operated at this time. If no other relay 3S is operated, relays 5GC and 5TG sequentially release, as described above, reopening the gate and admitting calls awaiting service.

The release action of relay 2A in the circuit 2IN15 disconnects the tip and ring leads 2T15 and 2R15 of trunk 2TK15 from the announcement equipment 6AN2, opens at its contact 8 the path controlling the operation of relay 6ST and thereby returns the intercept circuit 2IN15 to normal with respect to the call on the associated trunk. If no other calls are connected to any of the trunks 2TK00–14, and are awaiting to be served when relay 2A opens the operate path for relay 6ST, the relay 6ST releases. The release of relay 6ST opens the path through its contact 2 which initiated the operation of the equipment 6AN2 and thereby causes that equipment to cease operating. The release of relay 6ST also causes release of relay 6B by opening the locking path for that relay at its contact 1. However, if other calls are awaiting service, relay 6ST is not released and the equipment 6AN2 repeats the message, hereinbefore described, every 30 seconds.

When relay 3S in the circuit 3TR15 releases, it opens the operating path for relay 3T in the same circuit and causes it to release. The release of relay 3S also opens the operating path for the select magnet 4S9 and for relay 5TC. The operating path for the select magnet 4S9, as described above, is through contact 3 of relay 3S and the operating path for relay 5TC, also as described above, is through the lead 3TC and the contact 3 of relay 3S. When relay 5TC releases, it releases its associated relay 5TC1.

As hereinbefore stated, when relay 5SR operates, it also operates relay 5RN. The operating path for relay 5RN is from ground through the winding of relay 5RN, contact 5 of relay 5SR, the windings in parallel of relay 5D, the leads 3A0 and 3B0 in parallel of the cable 3CB, through contacts 4 and 6 of relay 3R, leads 3A1 and 3B1 to succeeding trunk circuits in the chain, and resistor 3R2 to battery 3B4. If any one of the relay 3R in the circuits 3TR00–14 is operated, the connection through the contacts 4 and 6 thereof is opened and the path of the chain through that trunk circuit is through contacts 3 and 5 of relay 3R and contacts 8 and 10 of relay 3S in the same trunk circuit. If some of the relays 3S in the circuits 3TR00–14 are operated, the lowest numbered one extends the connection from contacts 3 and 5 of its associated relay 3R through its contacts 7 and 9 to the upper winding of the associated relay 3T. The upper winding of relay 3T is connected to battery 3B3 and hence provides a supplementary path for operating relay 5RN; however, the impedance of the winding of relay 5RN limits the current through this path and prevents the operation of relay 3T in the lowest number trunk circuit. In the meantime, relay 5RN opens the operating path for relay 5SR causing it to release. Message register 5MS is released when contact 2 of relay 5SR opens and relay 5TR releases when contact 3 of relay 5SR opens upon the release of relay 5SR. Relay 5SR also opens, at its contact 1, the 5LA lamp circuit and causes the lamp to extinguish. The distributor system is in this manner returned to normal with respect to serving the abandoned call on trunk 2TK15. When relay 5SR releases, it opens the operating path of relay 5RN and it completes an operating path for a relay 3T associated with an operated relay 3S in the lowest numbered operated trunk. For example, if relay 3S in the trunk circuit 3TR00 is operated and the trunk circuit 3TR15 is returned to normal, the relay 3T in the circuit 3TR00 is operated. The operate path for the relay 3T in circuit 3TR00 is from battery 3B3 in the circuit 3TR00 through the lower winding of relay 3T, contacts 7 and 9 in parallel of relay 3S in the same circuit, contacts 3 and 5 of relay 3R in the same circuit, leads 3A0 and 3B0 in parallel, through cable 3CB, the windings of relay 5D in parallel, contact 6 of relay 5SR, contact 1 of relay 5L, and contact 1 of relay 5R1 to ground. When relay 3T in the circuit 3TR00 is operated, a sequence similar to that described above in reference to the call connected to the circuit 3TR15 is initiated for connecting call on trunk 3TR00 to one of the position circuits.

On the other hand, provided the call on trunk 2TK15 is not abandoned, relay 5TD operates to cancel the last mentioned release sequence of operations. When relay 5TD operates, a path is closed to check the operation of the select magnets 4S1 and 4S9. This path is from battery 5B10 through the lower and upper windings of relay 5SC, contact 2 of relay 5L, lead 5SCL of cable 5CA, contact 2 of relay 5TC1, lead 5SCL, the contact of select magnet 4S1, the contact of select magnet 4S9, lead 3D15, resistor 3R1, contact 1 of relay 3R, contact 2 of relay 3S, and over lead 3P15 of cable 3CC to ground through contact 15 of relay 5TR in the control circuit. The polarized relay 5SC operates in this path.

The operation of relay 5SC completes an operating path for one of the hold magnets 4H0–9 which corresponds to one vertical unit of a crossbar switch. The hold magnets of a crossbar switch are operated on a preference basis determined by the position circuits 7P00–09. Each of the circuits 7P00–09 includes a 7PA relay which is operated when the position is idle and ready to serve incoming calls. There are two conditions to be met in the circuits 7P00–09 for relay 7PA to be operated. First, the operator telephone circuit must be connected to the position circuit, and, second, the position must not be busy handling a call. If one or more of the circuits 7P00–09 is idle and ready to serve a call, the lowest numbered one is preferred as the relays 7PA in the 10 position circuits are connected in a preference chain. Assuming that the position circuit 7P00 is idle and ready to serve a call, a path is completed from ground supplied from the operator position circuit over lead A of cable 7A0, contact 6 of relay 8UN1, over lead A of cable 7A1, contact 2 of relay 7W, lead 7AG2, contact 00 of relay 5PG, lead 7AG1, and the winding of relay 7PA to battery 7B3. (It is noted that this path was continuous before the call progressed to this point and the position gate relay was operated.) Relay 7PA operates and locks through its contact 7, contact 2 of relay 7W to the ground supplied from the operator telephone circuit over lead A. The gate relay 5PG functions to gate position circuits 7P00–09 in a manner similar to that of the gate relay 5TG, which gates the trunk circuits 3TR00–15. When any one of the relays 7PA in the circuits 7P00–09 is operated, a ground connection is provided through its contact 8 and contact 2 of relay 5GC to the winding of the gate relay 5PG which is also connected to battery 5B2. When the gate relay 5PG is operated, it opens at its contacts 00–09 the opening path for all relays 7PA. Any one of the position circuits which may become available for serving a call thereafter must await the release of relay 5PG before its relay 7PA can operate. The relay 5PG remains operated as long as any one of relays 7PA is operated.

Returning now to previous discussion of the connecting sequence, when relay 5SC in the control circuit operates and the relay 7PA in the circuit 7P00 is operated, a connection is provided for operating the hold magnet 4H0. This path is from ground at contact 6 of relay 5TC1, contact 2 of relay 5TD, contact 2 of relay 5SC, the windings of relay 5P in parallel, leads 5PA and 5PB in parallel of cable 5CA, contacts 3 and 4 of relay 5TC1 in parallel, leads 5PA and 5PB in parallel through the cable 5CB, contacts 4 and 6 of relay 7PA in the circuit 7P00, lead 4HM0 of cable 4CA, and the winding of the hold magnet 4H0 to battery 4B0. The hold magnet 4H0 operates and connects the tip and ring leads 2T15 and 2R15 of trunk 2TK15, respectively, through the contacts 0 and 1 on the horizontal level 9, contacts 0 and 1 of horizontal level 1, over leads 4T0 and 4R0 of cable 4CA, leads T and R of cable 7A1, contacts 10 and 8 of relay 8UN1, and over leads T and R of cable 7A0 to the operator telephone circuit. When the hold magnet 4H0 operates, it also completes an operating path for a relay 7W in circuit 7P00. The operating path for the hold magnet 4H0, which was described above, is extended from lead 4HM0 through the contact of hold magnet 4H0, lead 4HML of cable 4CA, and the winding of relay 7W to battery 7B6. When relay 7W operates, it locks operated through its contact 3, over lead A1 of cable 7A1, contact 4 of relay 8UN1, over lead A1 of cable 7A0, and a contact of the operator release key 7RK to ground.

When relay 7W operates, it closes a path from battery 7B5 through resistor 7R1, contact 4 of relay 7W, over lead L of cable 7A1, contact 1 of relay 8UN1, over lead L of cable 7A0, and the resistance of lamp 7LM to ground for lighting this lamp and signaling the operator to answer the call.

The operation of relay 7W in turn causes the operation of relay 5PC in the control circuit to initiate the release of the common control equipment utilized for setting up the connection from the trunk 2TK15 through the crossbar switch to the circuit 7P00. The operating path for relay 5PC is from ground at contact 4 of relay 5R1 through the upper winding of relay 5PC, lead 5PC, contact 2 of relay 7PA, contact 1 of relay 7W, contact 7 of relay 7PA and the winding of relay 7PA to battery 7B3.

Upon operating, relay 7W opens the original locking path for the associated relay 7PA at its contact 2. However, relay 7PA is a slow release relay and remains operated over the above described path to ground through contact 1 of relay 7W and the winding of relay 5PC.

When relay 7W operates, it completes a locking path for relays 3S and 3T in the circuit 3TR15. This path is from ground through its contact 5, contact 1 of relay 7PA in parallel with the resistor 7R2, lead 4C0 of cable 4CA, contact 2 of horizontal level 1 of the crossbar switch, contact 2 of horizontal level 9 of the crossbar switch, lead 3C15, and then in parallel through the upper winding of relay 3S to battery 3B1 and through diode 3D1 through the upper winding of relay 3T to battery 3B3.

The operation of relay 5PC shunts the lower (high resistance) winding of relay 5SC to release relay 3R in trunk circuit 3TR15 and relay 2A in the intercept circuit 2IN15. The shunt path is from the winding of relay 3R through lead 3D15, the contact of select magnet 4S9, the contact of select magnet 4S1, lead 5SCL, contact 2 of relay 5TC1, lead 5SCL of cable 5CA, contact 2 of relay 5L, the upper winding of relay 5SC, and contact 2 of relay 5PC to battery 5B8. Before relay 5PC operated, the shunting path included the lower winding of relay 5SC as well as its upper winding. The lower winding, which is a high resistance winding, introduces sufficient impedance in the shunting path to permit relay 3R in the trunk circuit 3TR15 and relay 2A in the intercept circuit 2IN15 to remain operated, but when the shunting of this high resistance winding occurs relay 3R and relay 2A release.

The release action of relay 2A disconnects the tip and ring leads 2T15 and 2R15 of trunk 2TK15 from the announcement equipment 6AN2, opens at its contact 8 the path controlling the operation of relay 6ST, and thereby returns the intercept circuit 2IN15 to normal with respect to the call on the associated trunk. In the event that no other calls are connected to any of the trunks 2TK00–14 and are awaiting service when relay 2A opens the operating path for relay 6ST, the relay 6ST releases. The release of relay 6ST opens the path through its contact 2 which initiated the operation of the announcement equipment 6AN2 and thereby causes that equipment to cease operating. The release of relay 6ST also causes the release of relay 6B by opening the locking path for that relay at its contact 1. On the other hand, if other calls are awaiting service, relay 6ST is not released and the announcement equipment 6AN2 repeats to calling parties the message, hereinbefore described, every 30 seconds.

When relay 3R in the circuit 3TR15 releases, it opens the locking path through its contact 2 for its associated relay 3S. Relay 3S, however, remains operating over the locking circuit described above. As is hereinafter described, relay 3S remains operated when relay 7PA releases due to the shunting connection of resistor 7R2 across contact 1 of relay 7PA. When relay 3R releases, it also releases relay 5SC in the control circuit to initiate a release sequence for returning the distributor to normal relative to the call on trunk 2TK15 so that other calls can be served. The operating path for relay 5SC is open at contact 1 of relay 3R.

The release of relay 5SC closes an operating path for the differential relay 5L from ground at contact 6 of relay 5TC1, contact 2 of relay 5TD, contact 1 of relay 5SC, contact 2 of relay 5R1, and the upper winding relay 5L to battery 5B9. When relay 5L operates, it sequentially operates relays 5RA and 5R1 in the control circuit. The operating path for relay 5RA is from ground through the two windings of relay 5RA, contact 3 of relay 5L, lead 5SCL of cable 5CA, contact 2 of relay 5TC1, lead 5SCL, the contact of select magnet 4S1, the contact of select magnet 4S9, lead 3D15, and in parallel through the winding of relay 3R to battery 3B4, and through lead 2S15 and the winding of relay 2A to battery 2B2. Relay 5RA operates, but relays 3R and 2A do not operate over this path because the serially connected windings of relay 5RA introduce a large impedance sufficient to maintain relays 3R and 2A in their released condition. The shunting path which causes the release of relays 3R and 2A was open at contact 2 of relay 5L.

When relay 5RA operates, it closes an operating path through its contact 1 from ground through the winding of relay 5R1 to battery 5B11 for causing relay 5R1 to operate. When relay 5RA operates, it also connects ground through its contact 2 to the upper winding of relay 5PC to maintain it operated when relay 5R1 operates and removes at its contact 4 the ground potential therefrom.

The operation of relay 5R1 opens the operating path at its contact 1 for select magnet 4S9 causing it to release. When select magnet 4S9 releases, it opens the operating path through its contact for relay 5RA in the control circuit. As indicated above, the operating path for relay 5RA was through the contact of select magnet 4S9. The release action of relay 5RA in turn releases the polarized relay 5PC in the control circuit and also relay 7PA in the circuit 7P00. When relay 5R1 operated, it opened the original operating path through its contact 4 for relay 5PC, and thereafter when relay 5RA releases, it opens at its contact 2 the supplementary operating path so that relay 5PC releases. When the latter operating path is open at contact 2 of relay 5RA, the position relay 7PA also releases. The original operating path for relay 7PA, as described above, is through contact 00 of a gate relay 5PG. This relay 5PG, as also described above, remains operated as long as any one of the relays 7PA in the circuits 7P00–09 are operated.

When relay 5PC releases, it provides a shunting path from battery 5B8 to the lower winding of relay 5L causing it to release.

When relay 7PA in position circuit 7P00 releases, it introduces an impedance into the locking path for relay 3T in the circuit 3TR15. This locking path, as described above, for relay 3T is from ground at contact 5 of relay 7W through contact 1 of relay 7PA in parallel with resistor 7R2, lead 4C0 of cable 4CA, contact 2 of horizontal level 1 of the cross bar switch, contact 2 of horizontal level 9 of the cross bar switch, lead 3O15, diode 3D1, and the upper winding of relay 3T to battery 3B3. When relay 7PA releases, it opens the shunt through its contact 1 across resistor 7R2 thereby introducing an impedance into the locking circuit of the relay 3T and causing it to release. The relay 3S in the trunk circuit 3TR15, however, remains operated when relay 7PA removes the shunt across its contact 1 to cause relay 3T to release. When relay 3T releases, it in turn releases the select magnet 4S1 which was operated, as described above, over a path through contact 3 of relay 3T. When relay 3T releases, it also releases relay 5TD which operated to indicate that a call was not abandoned and it also releases relay 5TC. The operating path for relay 5TD, as described above, was through contact 1 of relay 3T and the operating path for relay 5TC was through contact 4 of relay 3T. When relay 5TC releases, it in turn sequentially causes the release of relay 5TC1 and relay 5R1. As described above, the relay 5R1 was locked under control of contact 6 of relay 5TC1.

The distributor circuits now are released to the extent whereby other calls may be connected through the system. The condition of the circuits at this point in the connection of the instant call may be summarized as follows. In the position circuit 7P00 only relay 7W is operated; in trunk circuit 3TR15 only relay 3S is operated, and only the hold magnet 4H0 of the cross bar switch is operated to maintain the connection between that said trunk and said position circuit. Circuits are at this point completed whereby the calling party and the operator attending position circuit 7P00 may converse. Under the present circumstances, supervision over the entire connection, discussed in detail hereinbefore, from the trunk 2TK15 through the trunk circuit 3TR15 and the crossbar switch to the operator position circuit 7P00 is maintained by the operator and controlled by the operator release key 7RK. At the completion of whatever conversation may result due to the connection between the calling party and the operator at position circuit 7P00, key 7RK will be momentarily operated to initiate the release of the connection between trunk 2TK15 and position circuit 7P00. The operation of key 7RK opens the locking paths for relay 7W in position circuit 7P00 and hold magnet 4H0 of the crossbar switch. The release action of relay 7W in turn opens the locking circuit at its contact 5 for relay 3S in the trunk circuit 3TR15. By virtue of these release actions, the trunk 2TK15 and position circuit 7P00 are disconnected.

*Intercept service during unattended periods.*— If, during a night period or period of light load, an operator does not attend any of the position circuits 7P00–09, an an unattended intercept service may be provided by the operation of key 8UN.

The actuation of key 8UN transfers control over position circuit 7P00 from the operator telephone circuit to the intercept circuitry of FIG. 8, and discontinues the hereinbefore described intercept services for attended periods which utilize the announcement equipments 6AN1 and 6AN2. Upon the operation of key 8UN, paths are closed for operating relays 8UN1, 8UN2 and 6J. These paths are from ground through contact 1 of key 8UN and in parallel to the winding of relays 8UN1, 8UN2 and 6J to negative battery connected to the respective windings of these relays.

The operation of relay 8UN1 opens all of the connections between the position circuit 7P00 and the associated operator telephone circuit, and closes connections between circuit 7P00 and the relay control circuitry of FIG. 8. The latter connections include the connection of leads A1 and A of cable 7A1 from the circuit 7P00 through contacts 3 and 5 of relay 8UN1 and contact 1 of relay 8UN3 to ground; and the connection of the R and T leads, respectively, of cable 7A1 from the circuit 7P00 through contacts 7 and 9 of relay 8UN1, the windings of relay 8UN4, and leads 8ATC and 8ARC to the equipment 8AN.

The operation of relay 8UN2 opens the operating paths through its contacts 1 to 9, inclusive, for all 7PA relays in circuits 7P01–9. After operators attend the circuits 7P01–9, disconnect equipment in the associated operator telephone circuit, the opening of the above-mentioned operating paths causes all 7PA relays to release. Since the operating path for relay 7PA in circuit 7P00 is not controlled through a contact of relay 8UN2, the only position then available for connection to an incoming call, after the position gate relay 5PG is released, is circuit 7P00; hence, all calls will be directed thereto. The other position circuits cannot thereafter be made available (by operators connecting operator telephone circuits to the associated position circuit) for handling calls until the 8UN key is released, since the operating circuit for the relay 7PA of circuits 7P01–9 remain open under control of relay 8UN2.

The operating circuit for relay 6ST is opened under control of contact 10 of relay 8UN2. In this manner the operation of the equipment 6AN2 and the associated circuits of relays 6RSA and 6B is discontinued.

Upon the operation of relay 6J, the circuits controlling the operations of relay 6TP, 6C and 6RS are opened at contacts 2 and 4 of relay 6J, and ground is connected through contact 1 of relay 8UN4 over lead 8A and contacts 1 and 3 in parallel to leads 2A3 and 2A4, respectively, for controlling, as hereinafter described, the operation of the intercept circuits 2IN00–15.

The automatic answering and message recording equipment 8AN shown in the block diagram of FIG. 8 may be similar to the equipment disclosed in Patent 2,761,899, granted September 4, 1956 to C. R. Keith et al. It will be apparent to those skilled in the art that this is a well known equipment and that the showing thereof in block diagram form is merely for purposes of clarity and understanding of the present invention and that it is not in any way intended to be limiting on the scope of this invention. The chief functions of the equipment are to record a message, to check the recorded message, to reproduce and transmit the recorded message to a calling party, and to record and incoming message dictated by the calling party. Since the present invention is concerned particularly with the latter two of the foregoing functions, the following description will present only the details of these functions necessary for an understanding of this invention. For other details of the equipment, reference should be made to the above-mentioned patent.

The circuits are now prepared to handle an incoming call. For purposes of illustrating the operation of the system in connecting an incoming call from the central office circuits over one trunk to position circuit 7P00, it is assumed again that a customer has originated a call through the central office to a customer served by the distributor and that the central office has extended the call to trunk 2TK15. It is also assumed that no other calls are in progress. The sequence of operations, as described above, for extending the connection through the distributor is initiated when ringing current is applied across the tip and ring leads to trunk 2TK15 and when ground is connected to the tip lead thereof. The operations involved in handling calls during unattended periods are similar to those described before and, therefore, do not require the detailed description thereof except at points of difference. Briefly, the sequence of operations is as follows: The application of a ringing signal to trunk 2TK15 operates relay 2R in circuit 2IN15. Relay 2R thereafter locks operated to ground at contact 1 of relay 2A in the same circuit. Later, when contact 1 of relay 2A is open, relay 2R remains lock operated under control to the ground connected to lead 2A4 via contact 3 of relay 6J and contact 1 of relay 8UN4. Relay 2R also closes an operating circuit for relay 2A in the circuit 2IN15 from ground at contact 1 of relay 8UN4 over lead 8A, contact 1 of relay 6J over lead 2A3, contact 1 of relay 2R, diode 2D and the winding of relay 2A to battery 2B2. The same ground extended to the winding of relay 2A is extended over lead 2S15 to the winding of relay 3R in the trunk circuit 3TR15 for operating relay 3R. Since the trunk gate is closed at this time, relay 3S in the circuit 3TR15 and relay 5GC operate as hereinbefore described. The operations that then occur are essentially the same as described above; that is, the circuit 3TR15 operates the gate circuit and the control circuit functions to check for an abandoned call, to operate the crossbar switch, and to connect the call through to position circuit 7P00. Upon connection of the call on trunk 2TK15 to position circuit 7P00, relay 7W operates in the way described above. The control circuit releases and subsequently releases relay 7PA of circuit 7P00, also as described above. The connection of this call to circuit 7P00 also extends the ringing signal (which was not tripped early in the connecting sequence) applied to trunk 2TK15 by the central office over leads T and R through the winding of relay 8UN4 and leads 8ATC and 8ARC to the equipment 8AN. This ringing signal operates relay 8UN4 and relay 8ST in the equipment 8AN. The operation of relay 8ST starts the operation of the equipment 8AN.

The operation of relay 8UN4 opens the above-described locking circuit for relays 2R and 2A in the circuit 2IN15 causing them to release and return the circuit 2IN15 to normal with respect to the call on trunk 2TK15. The operation of relay 8UN4 also closes an operating path for relay 8UN3 from ground through contact 2 of relay 8UN4, thermistor 8T and the winding of relay 8UN3 to battery 8B1. The thermistor 8T maintains the current through the winding of relay 8UN3 below its operating value until, as hereinafter described, the announcement equipment 8AN starts operation and trips the ringing signal at the central office. Subsequent to the application of the ringing signal to leads 8ATC and 8ARC and to the operation of relay 8ST, the equipment 8AN initiates operations for bridging the trunk line 2TK15 and for transmitting an announcement over said trunk. The bridging operation (not shown) consists of connecting a low impedance across the tip and ring leads of the trunk. As soon as the trunk 2TK15 is bridged, the ringing tripped relay (not shown) in the central office operates, for cutting off ringing current and for connecting ground and battery over the tip and ring leads 2T15 and 2R15 of trunk 2TK15. The latter potentials are for talking and for holding relay 8UN4 operated. The holding circuit is from battery and ground at the central office through the switch connections and the windings of relay 8UN4 to a continuous path (not shown in detail) within equipment 8AN. In response to the ringing signal, a recording mechanism and an amplifier circuit (not shown) within the equipment 8AN transmits an announcement to the calling party over leads 8ATC and 8ARC through the windings in parallel of relay 8UN4, contacts 7 and 9 of relay 8UN1, contacts of the crossbar switch over leads 3T15 and 3R15, and the tip and ring leads of trunk 2TK15. This announcement may relate to messages such as, for example: "This is a recorded announcement. The calling party X is not available at this time. You may dictate a message after the following tone or you may call again weekdays between the hours of 8 A.M. and 5 P.M." The equipment 8AN, after an appropriate delay, records the message if one is given and then releases in the manner prescribed in the aforementioned Patent 2,761,899.

In the meantime, relay 8UN3 operates and opens a path holding relay 7W in circuit 7P00 locked operated; however, as described presently, relay 7W therein does not release. The instant path extends from ground through contact 1 of relay 8UN3, contact 3 of relay 8UN1 over lead A1 of cable 7A1, contact 3 of relay 7W, and the winding relay 7W to battery 7B6. Relay 7W is held operated by a path which shunts contact 1 of relay 8UN3 to ground. The latter path extends from ground to contact 2 through relay 8UN4 and diode 8D.

Relay 8UN4 releases when the equipment 8AN opens its holding circuit, described hereinbefore, at the end of the interval set aside for receiving and recording the talk-in message. Relay 8UN4 thereupon opens a locking circuit for relay 7W in the circuit 7P00 which in turn releases and, as described above, initiates the release of the trunk circuit 3TR15 and the crossbar switch. The release of relay 8UN4 also opens the operating circuit for relay 8UN3; however, relay 8UN3, being a slow release relay, does not release until after the release of relay 7W in the circuit 7P00. Provided no other calls are awaiting service at this time, the circuits are sequentially restored to the conditions assumed initially. If other calls are then connected to one of the trunks 2TK00–15, the circuit operations involved in connecting these calls to circuit 7P00 are essentially the same as described above.

It is to be understood that the above-described arrangements are illustrative of the application of the principles of this invention. Numerous other arrangements may be devised by those skilled in the art without departing from the spirit and scope of the invention. For example, one such intercept service may utilize announcement equipment and control circuitry which intercepts, or answers, a call automatically with an announcement, then solicits a message from the caller and, after this message is received and recorded, routes the call to either an operator for service or, if the caller does not desire a connection to the operator and the call is abandoned, to automatic disconnect as described hereinbefore. This service would further reduce operator effort and the holding time of switching equipment. The utilization of such automatic facilities in semi-automatic telephone systems as call distributors, private branch exchanges, and the like, is a salient aspect of the invention. Therefore, it is evident that other arrangements may be devised without departing from the spirit and scope of the invention.

What is claimed is:

1. In a telephone system, a plurality of telephone lines, means for seizing said lines to extend calls thereto, a plurality of operator position circuits, switching means for connecting any one of said lines to any one of said circuits, means operable upon the seizure of any one of said lines for intercepting a call extended to the seized line, announcement equipment activated by said intercepting means for transmitting a recorded message to the seized line, means controlled by said equipment for activating said switching means to connect said seized line to one of said circuits, and means for conditioning said intercepting means to activate said switching means immediately upon the seizure of said seized line to connect said seized line directly to one of said circuits.

2. In a telephone system in accordance with claim 1 the combination further comprising means for conditioning said intercepting means to cancel the activation of said announcement equipment and the transmission of a recorded message to said seized line.

3. In a telephone system, a plurality of telephone lines, means for seizing said lines to extend calls thereto, a plurality of position circuits normally attended by operators, a switching arrangement for connecting any one of said lines to any one of said position circuits, announcement equipment, intercept means associated with said lines and operable upon the seizure of any one of said lines for intercepting a call extended to the seized line, means for connecting said seized line to said announcement equipment, means in said equipment operable during the connection of said seized line to said equipment to transmit a recorded message to said seized line, control means effective at the end of the transmission of said message to operate said switch arrangement to connect said seized line to a position circuit, special intercept means energizable for intercepting calls on lines connected to one of said position circuits, means for automatically answering calls intercepted by said special intercept means with a recorded announcement, and means for thereafter recording messages received over said lines.

4. The invention claimed in claim 3 wherein said special intercept means comprises selectively operable means for controlling said intercept means associated with said lines to effect the operation of said switch arrangement to connect seized lines directly to a position circuit and means for cancelling the connection of said lines to said announcement equipment.

5. The invention claimed in claim 4 wherein said plurality of position circuits comprise a first, intermediate and last position circuit, and wherein said special intercept means comprises means effective to control the availability of said first, intermediate and last position circuits for service.

6. The invention claimed in claim 5 wherein said special intercept means comprises means for only intercepting calls on lines connected to said first position circuit, and wherein said availability control means comprises means for permitting only said first position circuit to be available for service.

7. In a telephone system, a call distributor, a plurality of telephone lines incoming to said distributor, means for applying a calling signal to any one of said lines for extending calls to said lines, announcement equipment having a start condition and operative to advance from said start condition to transmit a recorded message to calling lines, means responsive to the application of a calling signal to any one of said lines for operating said equipment to effect the transmission of said message to the calling lines, restoral means including means for causing said equipment to assume said start condition subsequent to the end of said message and means for supplying an electrical condition signifying the end of said message, a plurality of of attendant position circuits, and means responsive to said condition for operating said distributor to establish connections from said calling line to one of said circuits.

8. In a switching system, a plurality of lines, a plurality of operator positions, switch means selectively operable for connecting any one of said lines to any one of said positions during periods when said positions are attended by operators, automatic answering and message recording equipment, means for connecting said equipment to one of said positions during periods when said positions are unattended, means for extending calls to said lines and for applying calling signals thereto, means controllable by said connecting means and responsive to a calling signal on any one of said lines for operating said switch means to effect the connection of said signaled line only to said one position and said equipment during said unattended periods, and said equipment including means responsive to a calling signal on the connected line for automatically answering the call extended to said line with a recorded announcement and means for thereafter recording a message received over said line.

9. In a telephone system, a plurality of trunks for serving telephone calls, a plurality of operator position circuits, a switch arrangement for connecting said trunks to said operator position circuits, announcement equipment, means for applying signaling currents to said trunks to control the establishment of connections from said signaled trunks to said announcement equipment and from said signaled trunks to said operator position circuits, a plurality of intercept circuits, each of said intercept circuits associated with one of said trunks, a control circuit effective to control said intercept circuits to establish connections between said trunks and said announcement equipment, intercept means in each of said intercept circuits operative under control of signaling current on said associated trunk for operating said control circuit to effect the establishment of connections between said signaled trunk and said announcement equipment, means in said control circuit for activating said equipment to transmit a recorded message to said signaled trunk, and means effective at the end of a single transmission of said message to operate said switch arrangement to connect said signaled trunk to an operator position circuit, said control circuit comprising means for conditioning said intercept means to operate said switch arrangement immediately after the application of signaling current to said signaled trunk and means for controlling said intercept means to cancel a connection of said signaled trunk to said equipment upon the application of signaling current to said signaled trunk.

10. In a telephone system, a plurality of trunks for serving telephone calls, a plurality of operator position circuits, a switching arrangement for connecting said trunks to said circuits, announcement equipment, means for applying signaling currents to said trunks to control the establishment of connections from said signaled trunks to said equipment and from said signaled trunks to said circuits, a plurality of intercept circuits, each of said intercept circuits associated with one of said trunks, a control circuit effective to control said intercept circuits to establish connections between said trunks and said equipment, intercept means in each of said intercept circuits operative under control of signaling current on said associated trunk for operating said control circuit to effect the establishment of connections between said signaled trunk and said equipment, said intercept means comprising receiving means and auxiliary means for connecting said signaling current on said associated trunk to said receiving means to operate said receiving means, said control circuit comprising means for operating said auxiliary means subsequent to the operation of said receiving means to effect the transfer of said signaling current from said receiving means to said control circuit, means effective to operate said signaling current applying means to control the disconnection of said signaling current from said signaled trunk and means for connecting said signaled trunk to said equipment, means in said equipment operable during the connection of said signaled trunk to said equipment to transmit a recorded message to said signaled trunk, and means effective at the end of a single transmission of said message to operate said arrangement to connect said signaled trunk to one of said position circuits.

11. The invention claimed in claim 10 wherein special means is provided in said control circuit for controlling the operation of said announcement equipment, wherein said announcement equipment has a start condition and is operative under control of said special means to advance from said start condition to transmit said recorded message to said signaled trunk, wherein restoral means is provided in said announcement equipment for causing said equipment to assume said start condition subsequent to the end of said message and for supplying an electrical condition signifying the end of said message, and wherein said control circuit includes means responsive to said electrical condition from said restoral means for controlling the disconnection of said signaled trunk from said announcement equipment.

12. A distributing system comprising a central office, a call distributor, a plurality of trunks each extending from said central office to said call distributor, and means at said central office for extending calls to said trunks and for applying signaling currents to said trunks, said call distributor including a plurality of position circuits normally attended by operators; a crossbar switch having a first and a second group of horizontal conductors and a plurality of vertical conductors which form a number of links between said first and second groups of horizontal conductors, each of said first group of horizontal conductors connected to two of said trunks, each of said second group of horizontal conductors connected to one of said position circuits; a trunk circuit for each of said trunks; an intercept circuit associated with each trunk and each trunk circuit, means in each of said intercept circuits for responding to signaling current on said associated trunk and for intercepting a call extended thereto; announcement equipment; a special control circuit operable under control of said responding means to connect a signaled trunk to said announcement equipment; said announcement equipment including means operable during the connection of a signaled trunk to transmit a recorded message to said signaled trunk; means included in said special control circuit effective at the end of a single transmission of said message to operate said trunk circuit associated with a signaled trunk; and means controlled by said operated trunk circuit for operating said crossbar switch to connect said signaled trunk to one of said position circuits.

13. A distributing system comprising a central office, a call distributor, a plurality of trunks each extending from said office to said distributor, and means at said office for extending calls to said trunks and for applying signaling currents to said trunks, said distributor including first, intermediate and last operator position circuits, a crossbar switch having first and second groups of horizontal conductors and a plurality of vertical conductors forming a number of links between said first and second groups of horizontal conductors, each of said first group of horizontal conductors connected to two of said trunks, each of said second group of horizontal conductors connected to one of said circuits, a trunk circuit for each of said trunks, an intercept circuit associated with each trunk and each trunk circuit, means in each of said intercept circuits for responding to signaling current on said associated trunk to intercept a call extended thereto, announcement equipment, a special control circuit operable under control of said responding means to connect a signaled trunk to said equipment, said equipment including means operable during the connection of said signaled trunk to transmit a recorded message to said signaled trunk, means included in said special control circuit effective at the end of a single transmission of said message to operate said trunk circuit associated with a signaled trunk, means controlled by said operated trunk circuit for operating said crossbar switch to connect said signaled trunk to one of said position circuits, answering and recording equipment, a special intercept circuit, selectively operable means for associating said answering and recording equipment and said special intercept circuit with said first position circuit, control means in said special intercept circuit operable under control of said associating means to control said special control circuit, said position circuits, said intercept circuits and said trunk circuits to effect the operation of said crossbar switch to establish connections from a signaled trunk to said answering and recording equipment without first connecting said signaled trunk to said announcement equipment, and means in said answering and recording equipment responsive to signaling current on a connected trunk for automatically answering the call extended to said trunk and for thereafter recording a message received over said trunk.

14. The invention claimed in claim 13 wherein said control means in said special intercept circuit includes first circuit means for preventing the operation of said special control circuit while said answering and recording equipment is associated with said one position circuit, second circuit means for rendering said intermediate and last position circuits unavailable for service, and third circuit means for controlling the holding of an established connection from a signaled trunk to said answering and recording equipment and for controlling the disengagement of said established connection.

15. In a switching system, a plurality of communication lines, means for applying a calling signal to any one of said lines to extend calls thereto, announcement equipment, a line circuit associated with each of said lines and operated by a calling signal on said associated line for connecting the calling line to said equipment to receive a recorded announcement, a plurality of operator positions, switch means operated by said equipment at the end of said announcement for connecting said calling line to any of said positions, an answering and recording device associated with one of said positions, and means for selectively controlling the operation of said switch means to connect said calling line to said one position and said device for answering the call extended to said line and thereafter recording a message received over said line.

16. In a telephone system, a plurality of telephone lines, means for applying a calling signal to any one of said lines to extend calls thereto, announcement equipment, a line circuit responsive to a calling signal on any one of said lines for connecting the calling line to said equipment, means operable during the connection of said calling line to said equipment for communicating a first message to said calling line, an announcement device, means activated by said equipment at the end of said message communication for connecting said calling line to said device, means operable during the connection of said calling line to said device for communicating a second message to said calling line, a plurality of operator position circuits, switching means, and means controllable by said equipment for activating said switching means to connect said calling line to one of said circuits.

17. In a telephone system in accordance with claim 16 the combination wherein said announcement equipment has a start condition and is operative to advance from said condition to transmit said first message to a calling line, and further comprising means responsive to a calling signal on said calling line for operating said announcement equipment to effect the transmission of said first message to said calling line.

18. In a telephone system in accordance with claim 17 the combination wherein said announcement device has a start condition and is operative to advance from said start condition to supply said second message, and further comprising means operating said device at the end of the transmission of said first message, and means activated by said device for applying the supplied second message to said calling line.

19. In a telephone system in accordance with claim 18 the combination further comprising means for automatically answering calls extended to one of said operator position circuits and thereafter recording messages received over said lines.

20. In a telephone system in accordance with claim 19 the combination further comprising means for conditioning said activating means to activate said switching means immediately upon the receipt of a calling signal on said calling line to connect said calling line to one of said position circuits.

21. In a telephone system in accordance with claim 20 the combination further comprising means for conditioning said line circuit to cancel the connection of said calling line to said announcement equipment and said announcement device.

References Cited in the file of this patent

UNITED STATES PATENTS 2,520,130 Deakin .............. Aug. 29, 1950

(Other references on following page)

UNITED STATES PATENTS

| | | |
|---|---|---|
| 2,525,763 | Beatty | Oct. 17, 1950 |
| 2,764,636 | Gray | Sept. 25, 1956 |
| 2,892,890 | Pharis | June 30, 1959 |
| 2,936,336 | Cooke et al. | May 10, 1960 |
| 2,937,237 | Zanardo | May 17, 1960 |
| 2,946,852 | Brown | July 26, 1960 |
| 2,966,551 | Lomax | Dec. 27, 1960 |
| 3,014,989 | Smith | Dec. 26, 1961 |
| 3,050,585 | Zimmerman | Aug. 21, 1962 |